(12) United States Patent
Liu et al.

(10) Patent No.: US 11,870,564 B2
(45) Date of Patent: *Jan. 9, 2024

(54) HIGH-SPEED AUDIO DATA TRANSMISSION METHOD AND APPARATUS

(71) Applicant: Huawei Technologies Co., Ltd., Shenzhen (CN)

(72) Inventors: Huazhang Liu, Shenzhen (CN); Zhan Yu, Singapore (SG); Tong Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/968,279

(22) Filed: Oct. 18, 2022

(65) Prior Publication Data

US 2023/0113453 A1    Apr. 13, 2023

Related U.S. Application Data

(63) Continuation of application No. 16/992,600, filed on Aug. 13, 2020, now Pat. No. 11,489,614, which is a
(Continued)

(30) Foreign Application Priority Data

Feb. 14, 2018    (CN) .......................... 201810151616.7

(51) Int. Cl.
*H04B 1/04* (2006.01)
*H04L 25/03* (2006.01)
(Continued)

(52) U.S. Cl.
CPC ............ *H04L 1/0002* (2013.01); *H04L 27/10* (2013.01); *H04L 27/18* (2013.01); *H04L 45/74* (2013.01);
(Continued)

(58) Field of Classification Search
CPC ....... H04L 1/0002; H04L 27/10; H04L 27/18; H04L 45/74; H04L 69/323; H04L 2212/00; H04W 4/80
(Continued)

(56) References Cited

U.S. PATENT DOCUMENTS 8,159,990 B2    4/2012    Haartsen et al.
8,565,348 B2    10/2013    Tsunoda et al.
(Continued)

FOREIGN PATENT DOCUMENTS

CN    1960482 A    5/2007
CN    101047677 A    10/2007
(Continued)

OTHER PUBLICATIONS

Cruickshank, H., et al, "Security requirements for the Unidirectional Lightweight Encapsulation (ULE) protocol," draft-ietf-ipdvb-sec-req-05.txt, IPDVB Working Group, Nov. 18, 2007, 28 pages.
(Continued)

*Primary Examiner* — Tanmay K Shah
(74) *Attorney, Agent, or Firm* — Conley Rose, P.C.

(57) ABSTRACT

An audio data transmission method includes encapsulating, based on a physical layer frame header, a protocol data unit (PDU) including audio data, to obtain an audio data packet, where the physical layer frame header is modulated using a first digital modulation scheme, the PDU is modulated using a second digital modulation scheme, a value of a modulation rate of the first digital modulation scheme is equal to a value of a data transmission rate, and a value of a modulation rate of the second digital modulation scheme is less than the value of the data transmission rate, and sending the audio data packet on a BLUETOOTH low energy (BLE) physical channel at the data transmission rate.

20 Claims, 11 Drawing Sheets

Related U.S. Application Data continuation of application No. PCT/CN2019/070803, filed on Jan. 8, 2019.

(51) Int. Cl.
*H04L 1/00* (2006.01)
*H04W 4/80* (2018.01)
*H04L 27/10* (2006.01)
*H04L 27/18* (2006.01)
*H04L 45/74* (2022.01)
*H04L 69/323* (2022.01)

(52) U.S. Cl.
CPC ............ *H04L 69/323* (2013.01); *H04W 4/80* (2018.02); *H04L 2212/00* (2013.01)

(58) Field of Classification Search
USPC ........................................................ 370/229
See application file for complete search history.

(56) References Cited

U.S. PATENT DOCUMENTS

| | | |
|---|---|---|
| 9,408,147 B2 | 8/2016 | Polo et al. |
| 9,756,455 B2 | 9/2017 | Kawabe et al. |
| 11,489,614 B2 * | 11/2022 | Liu .................... H04L 27/0008 |
| 2001/0010689 A1 | 8/2001 | Awater et al. |
| 2004/0076188 A1 | 4/2004 | Milbar et al. |
| 2005/0025054 A1 | 2/2005 | D et al. |
| 2009/0116462 A1 | 5/2009 | Powell et al. |
| 2009/0207861 A1 | 8/2009 | Annuzzelli et al. |
| 2011/0051635 A1 | 3/2011 | Yang et al. |
| 2013/0028350 A1 | 1/2013 | Tsunoda et al. |
| 2013/0157568 A1 | 6/2013 | Jain et al. |
| 2014/0188348 A1 | 7/2014 | Gautama et al. |
| 2015/0180688 A1 | 6/2015 | Li |
| 2015/0312858 A1 | 10/2015 | Kerai |
| 2015/0327001 A1 | 11/2015 | Kirshenberg et al. |
| 2016/0142177 A1 | 5/2016 | Chou et al. |
| 2016/0173305 A1 | 6/2016 | Zheng et al. |
| 2016/0242134 A1 | 8/2016 | Amini et al. |
| 2016/0353229 A1 | 12/2016 | Kawabe et al. |
| 2017/0353823 A1 | 12/2017 | Kawabe et al. |
| 2018/0302911 A1 | 10/2018 | Aijaz et al. |

FOREIGN PATENT DOCUMENTS

| | | |
|---|---|---|
| CN | 101163130 A | 4/2008 |
| CN | 101222793 A | 7/2008 |
| CN | 101849387 A | 9/2010 |
| CN | 101902816 A | 12/2010 |
| CN | 101969336 A | 2/2011 |
| CN | 101978668 A | 2/2011 |
| CN | 102006253 A | 4/2011 |
| CN | 102355309 A | 2/2012 |
| CN | 102739587 A | 10/2012 |
| CN | 102769590 A | 11/2012 |
| CN | 103747441 A | 4/2014 |
| CN | 103905127 A | 7/2014 |
| CN | 104115426 A | 10/2014 |
| CN | 104938024 A | 9/2015 |
| CN | 105657739 A | 6/2016 |
| CN | 105898672 A | 8/2016 |
| JP | 2002261738 A | 9/2002 |
| JP | 2006503523 A | 1/2006 |
| JP | 2006080733 A | 3/2006 |
| JP | 2012054941 A | 3/2012 |
| JP | 2013031088 A | 2/2013 |
| JP | 2018182728 A | 11/2018 |
| KR | 100955547 B1 | 4/2010 |

OTHER PUBLICATIONS

R1-142612, NSN, "Update of the TR based on agreements done on RAN1#77 meeting," 3GPP TSG-RAN WG1 Meeting #77, Seoul, South Korea, May 19-23, 2014, 105 pages.

Bocker, S., et al, "On the Suitability of Bluetooth 5 for the Internet of Things: Performance and Scalability Analysis," IEEE, 2017, 7 pages.

Hansen, C. "Internetworking With Bluetooth Low Energy" Get Mobile: Mobile Computing and Communications, vol. 19, Issue 2 Association for Computing Machinery, New York, NY, United States, Apr. 2015 pp. 34-38.

"Introduction to Bluetooth Device Testing From Theory to Transmitter and Receiver Measurements," National Instruments, Sep. 2016, 119 pages.

* cited by examiner

HIGH-SPEED AUDIO DATA TRANSMISSION METHOD AND APPARATUS

CROSS-REFERENCE TO RELATED APPLICATIONS

This is a continuation of U.S. patent application Ser. No. 16/992,600, filed on Aug. 13, 2020, which is a continuation of International Patent Application No. PCT/CN2019/070803, filed on Jan. 8, 2019, which claims priority to Chinese Patent Application No. 201810151616.7, filed on Feb. 14, 2018. All of the aforementioned patent applications are hereby incorporated by reference in their entireties.

TECHNICAL FIELD

The present application relates to the communications field, and in particular, to an audio data transmission method and apparatus.

BACKGROUND

With rapid development of mobile communications technologies, portable devices such as mobile phones and tablet computers have become necessities in people's daily life, and a BLUETOOTH technology has become a standard configuration for these portable devices.

Listening to BLUETOOTH music based on a BLUETOOTH technology is one of the most valuable applications of BLUETOOTH. The advanced audio distribution profile (A2DP) is used for an application to implement a function of playing the BLUETOOTH music. Based on a conventional BLUETOOTH technology, audio data is transmitted using an asynchronous connection-oriented logical transport (ACL) connection between devices, and currently, a BLUETOOTH device can provide a maximum physical rate of 3 megabits per second (Mb/s).

However, limited by a physical rate in a current BLUETOOTH specification, BLUETOOTH audio is transmitted in a lossy compression mode with a relatively high compression ratio, and transmission of higher-definition audio data cannot be supported.

SUMMARY

Embodiments of this application provide an audio data transmission method and apparatus, to increase an audio data transmission rate, thereby supporting transmission of higher-definition audio data.

According to a first aspect, an embodiment of this application provides an audio data transmission method. The method includes encapsulating, based on a physical layer frame header, a protocol data unit (PDU) including audio data, to obtain an audio data packet, where the physical layer frame header is modulated using a first digital modulation scheme, the PDU is modulated using a second digital modulation scheme, a value of a modulation rate of the first digital modulation scheme is equal to a value of a data transmission rate, and a value of a modulation rate of the second digital modulation scheme is less than the value of the data transmission rate, and sending the audio data packet on a BLUETOOTH low energy (BLE) physical channel at the data transmission rate.

In the foregoing method, the physical layer frame header is modulated using the first digital modulation scheme, and the PDU is modulated using the second digital modulation scheme. Because the physical layer frame header and the PDU are modulated using two different modulation schemes, the modulation rate of the modulation scheme for the PDU is lower than the data transmission rate, that is, a same symbol can carry more bits, thereby increasing an audio data transmission rate. Therefore, transmission of high-definition audio data can be supported.

In a possible design, the method further includes generating a modulation scheme identifier of the BLE physical channel, based on the modulation scheme identifier, determining that the physical layer frame header uses the first digital modulation scheme, and determining that the PDU uses the second digital modulation scheme, and sending the modulation scheme identifier.

In the foregoing method, the modulation scheme used by the physical layer frame header and the modulation scheme used by the PDU can be determined based on the modulation scheme identifier. In this way, a receiving device can demodulate the PDU based on the determined modulation scheme. In a possible design, the data transmission rate is N times the modulation rate of the second digital modulation scheme, where N is an integer greater than 1.

In the foregoing method, high-definition audio data can be transmitted on the BLE physical channel at the data transmission rate based on the PDU that is modulated using the second digital modulation scheme.

In a possible design, the PDU includes a control layer frame header and a payload, the payload is used to carry the audio data, and the control layer frame header includes indication information used to indicate a length of the audio data.

In the foregoing method, the receiving device can verify, based on the indication information for the length of the audio data in the control layer frame header, whether the received audio data is complete.

In a possible design, a bandwidth of the BLE physical channel is 2 megahertz (MHz), or a bandwidth of the BLE physical channel is 4 MHz, and the physical channel having the bandwidth of 4 MHz is formed by combining two adjacent physical channels each having a bandwidth of 2 MHz.

In the foregoing method, the audio data can be transmitted at different data transmission rates using bandwidths of different physical channels.

In a possible design, the first digital modulation scheme includes Gaussian frequency-shift keying (GFSK), and the second digital modulation scheme includes differential quadrature phase-shift keying (DQPSK) or 8-differential phase shift keying (8DPSK).

In the foregoing method, the first digital modulation scheme is the GFSK, and the second digital modulation scheme is the DQPSK or the 8DPSK. In this way, compatibility between a BLE mode and an enhanced data rate (EDR) mode is implemented, and power consumption can be reduced while the audio data is transmitted at a high speed.

In a possible design, a modulation factor of the GFSK ranges from 0.45 to 0.55.

In the foregoing method, the modulation factor of the GFSK falls within the range from 0.45 to 0.55 such that an original hardware device can be used, thereby saving hardware resources.

In a possible design, an audio connection end command is sent on the BLE physical channel.

In the foregoing method, a sending device is disconnected from the receiving device using the audio connection end command, to avoid power consumption of the sending device and the receiving device, and avoid a waste of resources.

In a possible design, the method further includes querying a codec parameter using the logical link control and adaptation protocol (L2CAP), where the codec parameter includes a coding parameter of the audio data, and encoding original audio data based on the coding parameter, to obtain the audio data.

In the foregoing method, the coding parameter is queried using the L2CAP, and the original audio data is encoded, to ensure normal audio play.

According to a second aspect, an embodiment of this application provides an audio data transmission method. The method includes receiving an audio data packet on a BLE physical channel, where the audio data packet includes a physical layer frame header and a PDU, and demodulating the physical layer frame header using a first digital modulation scheme, and demodulating the PDU using a second digital modulation scheme, to obtain audio data, where a value of a modulation rate of the first digital modulation scheme is equal to a value of a data transmission rate, and a value of a modulation rate of the second digital modulation scheme is less than the value of the data transmission rate.

In the foregoing method, the audio data packet is received on the BLE physical channel, the physical layer frame header is demodulated using the first digital modulation scheme, and the PDU is demodulated using the second digital modulation scheme. The modulation rate of the modulation scheme for the PDU of the received audio data packet is lower than the data transmission rate, that is, a same symbol can carry more bits, thereby increasing an audio data transmission rate, and supporting transmission of high-definition audio data.

In a possible design, the method further includes receiving a modulation scheme identifier of the BLE physical channel, and determining, based on the modulation scheme identifier, that the physical layer frame header uses the first digital modulation scheme, and determining, based on the modulation scheme identifier, that the PDU uses the second digital modulation scheme.

In the foregoing method, the first digital modulation scheme and the second digital modulation scheme can be determined based on the modulation scheme identifier, and then the audio data can be successfully demodulated.

In a possible design, the modulation rate of the first digital modulation scheme is equal to the data transmission rate, and the data transmission rate is N times the modulation rate of the second digital modulation scheme, where N is an integer greater than 1.

In the foregoing method, high-definition audio data can be transmitted on the BLE physical channel at the data transmission rate based on the PDU that is modulated using the second digital modulation scheme.

In a possible design, after the obtaining audio data, the method further includes returning an acknowledgement message to a sending device, where the acknowledgement message is used to indicate a receiving status of the audio data.

In the foregoing method, the acknowledgement message is returned to the sending device, to notify the sending device whether a receiving device receives the audio data.

According to a third aspect, an embodiment of this application provides an audio data transmission apparatus. The apparatus includes a baseband processor and a transmitter, the baseband processor encapsulates, based on a physical layer frame header, a PDU including audio data, to obtain an audio data packet, where the physical layer frame header is modulated using a first digital modulation scheme, the PDU is modulated using a second digital modulation scheme, a value of a modulation rate of the first digital modulation scheme is equal to a value of a data transmission rate, and a value of a modulation rate of the second digital modulation scheme is less than the value of the data transmission rate, and the transmitter sends the audio data packet on a BLE physical channel at the data transmission rate.

For the foregoing apparatus, the physical layer frame header is modulated using the first digital modulation scheme, and the PDU is modulated using the second digital modulation scheme. Because the physical layer frame header and the PDU are modulated using two different modulation schemes, the modulation rate of the modulation scheme for the PDU is lower than the data transmission rate, that is, a same symbol can carry more bits, thereby increasing an audio data transmission rate. Therefore, transmission of high-definition audio data can be supported.

In a possible design, the apparatus further includes an audio codec configured to generate a modulation scheme identifier of the BLE physical channel, the baseband processor is configured to, based on the modulation scheme identifier, determine that the physical layer frame header uses the first digital modulation scheme, and determine that the PDU uses the second digital modulation scheme, and the transmitter is configured to send the modulation scheme identifier.

In a possible design, the data transmission rate is N times the modulation rate of the second digital modulation scheme, where N is an integer greater than 1.

In a possible design, the PDU includes a control layer frame header and a payload, the payload is used to carry the audio data, and the control layer frame header includes indication information used to indicate a length of the audio data.

In a possible design, a bandwidth of the BLE physical channel is 2 MHz, or a bandwidth of the BLE physical channel is 4 MHz, and the physical channel having the bandwidth of 4 MHz is formed by combining two adjacent physical channels each having a bandwidth of 2 MHz.

In a possible design, the first digital modulation scheme includes GFSK, and the second digital modulation scheme includes DQPSK or 8DPSK.

In a possible design, a modulation factor of the GFSK ranges from 0.45 to 0.55.

In a possible design, the apparatus further includes an audio codec, the codec is configured to query a codec parameter using the L2CAP, where the codec parameter includes a coding parameter of the audio data, and the codec is further configured to encode original audio data based on the coding parameter, to obtain the audio data.

According to a fourth aspect, an embodiment of this application provides an audio data transmission apparatus. The apparatus includes a receiver and a baseband processing module, the receiver is configured to receive an audio data packet on a BLE physical channel, where the audio data packet includes a physical layer frame header and a PDU, and the baseband processing module is configured to demodulate the physical layer frame header using a first digital modulation scheme, and demodulate the PDU using a second digital modulation scheme to obtain audio data, where a value of a modulation rate of the first digital modulation scheme is equal to a value of a data transmission rate, and a value of a modulation rate of the second digital modulation scheme is less than the value of the data transmission rate.

In the foregoing apparatus, the audio data packet is received on the BLE physical channel, the physical layer frame header is demodulated using the first digital modulation scheme, and the PDU is demodulated using the second digital modulation scheme. The modulation rate of the modulation scheme for the PDU is lower than the data transmission rate, that is, a same symbol can carry more bits, thereby increasing an audio data transmission rate, and supporting transmission of high-definition audio data.

In a possible design, the apparatus further includes an audio codec, the receiver is configured to receive a modulation scheme identifier of the BLE physical channel, and the codec is configured to determine, based on the modulation scheme identifier, that the physical layer frame header uses the first digital modulation scheme, and determine, based on the modulation scheme identifier, that the PDU uses the second digital modulation scheme.

In a possible design, the value of the data transmission rate is N times the value of the modulation rate of the second digital modulation scheme, where N is an integer greater than 1.

According to a fifth aspect, an embodiment of this application provides an audio data transmission apparatus. The apparatus includes an encapsulation module and a transmission module, the encapsulation module encapsulates, based on a physical layer frame header, a PDU including audio data, to obtain an audio data packet, where the physical layer frame header is modulated using a first digital modulation scheme, the PDU is modulated using a second digital modulation scheme, a value of a modulation rate of the first digital modulation scheme is equal to a value of a data transmission rate, and a value of a modulation rate of the second digital modulation scheme is less than the value of the data transmission rate, and the transmission module sends the audio data packet on a BLE physical channel at the data transmission rate.

In a possible design, the data transmission rate is N times the modulation rate of the second digital modulation scheme, where N is an integer greater than 1.

In a possible design, the PDU includes a control layer frame header and a payload, the payload is used to carry the audio data, and the control layer frame header includes indication information used to indicate a length of the audio data.

In a possible design, a bandwidth of the BLE physical channel is 2 MHz, or a bandwidth of the BLE physical channel is 4 MHz, and the physical channel having the bandwidth of 4 MHz is formed by combining two adjacent physical channels each having a bandwidth of 2 MHz.

In a possible design, the first digital modulation scheme includes GFSK, and the second digital modulation scheme includes DQPSK or 8DPSK.

In a possible design, a modulation factor of the GFSK ranges from 0.45 to 0.55.

In a possible design, the apparatus further includes a codec module, the codec module is configured to query a codec parameter using the L2CAP, where the codec parameter includes a coding parameter of the audio data, and the codec module is further configured to encode original audio data based on the coding parameter, to obtain the audio data.

According to a sixth aspect, an embodiment of this application provides a high-speed audio data transmission apparatus. The apparatus includes a receiving module and a demodulation module, the receiving module is configured to receive an audio data packet on a BLE physical channel, where the audio data packet includes a physical layer frame header and a PDU, and the demodulation module is configured to demodulate the physical layer frame header using a first digital modulation scheme, and demodulate the PDU using a second digital modulation scheme to obtain audio data, where a value of a modulation rate of the first digital modulation scheme is equal to a value of a data transmission rate, and a value of a modulation rate of the second digital modulation scheme is less than the value of the data transmission rate.

In a possible design, the apparatus further includes a codec module, the receiving module is configured to receive a modulation scheme identifier of the BLE physical channel, and the codec module is configured to determine, based on the modulation scheme identifier, that the physical layer frame header uses the first digital modulation scheme, and determine, based on the modulation scheme identifier, that the PDU uses the second digital modulation scheme.

In a possible design, the value of the data transmission rate is N times the value of the modulation rate of the second digital modulation scheme, where N is an integer greater than 1.

According to a seventh aspect, an embodiment of this application provides a computer-readable storage medium. The computer-readable storage medium stores an instruction, and when the instruction runs on a computer or a processor, the computer or the processor is enabled to perform the method according to any one of the first aspect or the second aspect or the possible designs thereof.

An eighth aspect of this application provides a computer program product including an instruction, where when the instruction runs on a computer or a processor, the computer or the processor is enabled to perform the method according to any one of the first aspect or the second aspect or the possible designs thereof.

DESCRIPTION OF EMBODIMENTS

Figure 1:
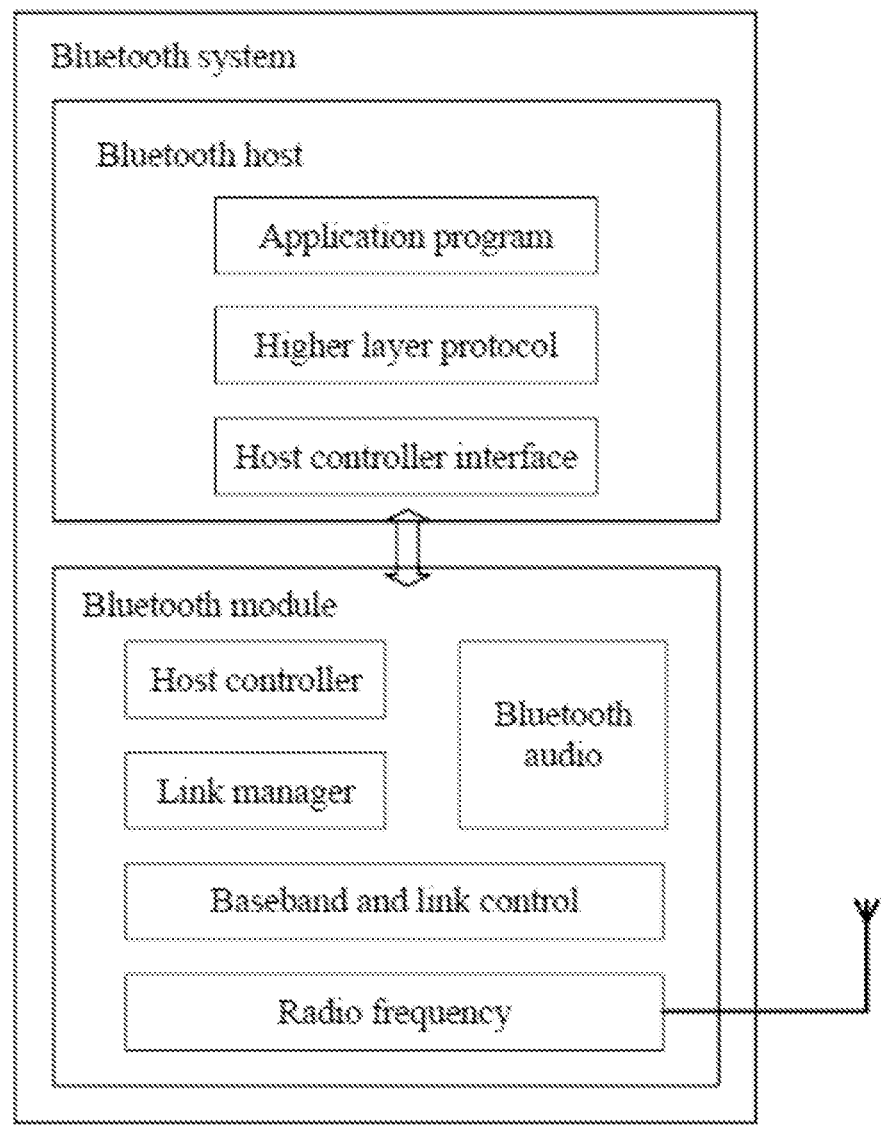
FIG. 1 is an overall framework diagram of a typical BLUETOOTH system according to an embodiment of this application.

FIG. 1 is an overall framework diagram of a typical BLUETOOTH system according to an embodiment of this application. As shown in the figure, the BLUETOOTH system includes a BLUETOOTH host and a BLUETOOTH module. The BLUETOOTH host exchanges data with the BLUETOOTH module through a host controller interface (HCI) under control of an application program and a higher layer protocol. The BLUETOOTH host exchanges data with another BLUETOOTH system using a host controller, a link manager (LinkManager), BLUETOOTH audio, baseband and link control, and radio frequency in the BLUETOOTH module.

Figure 2:
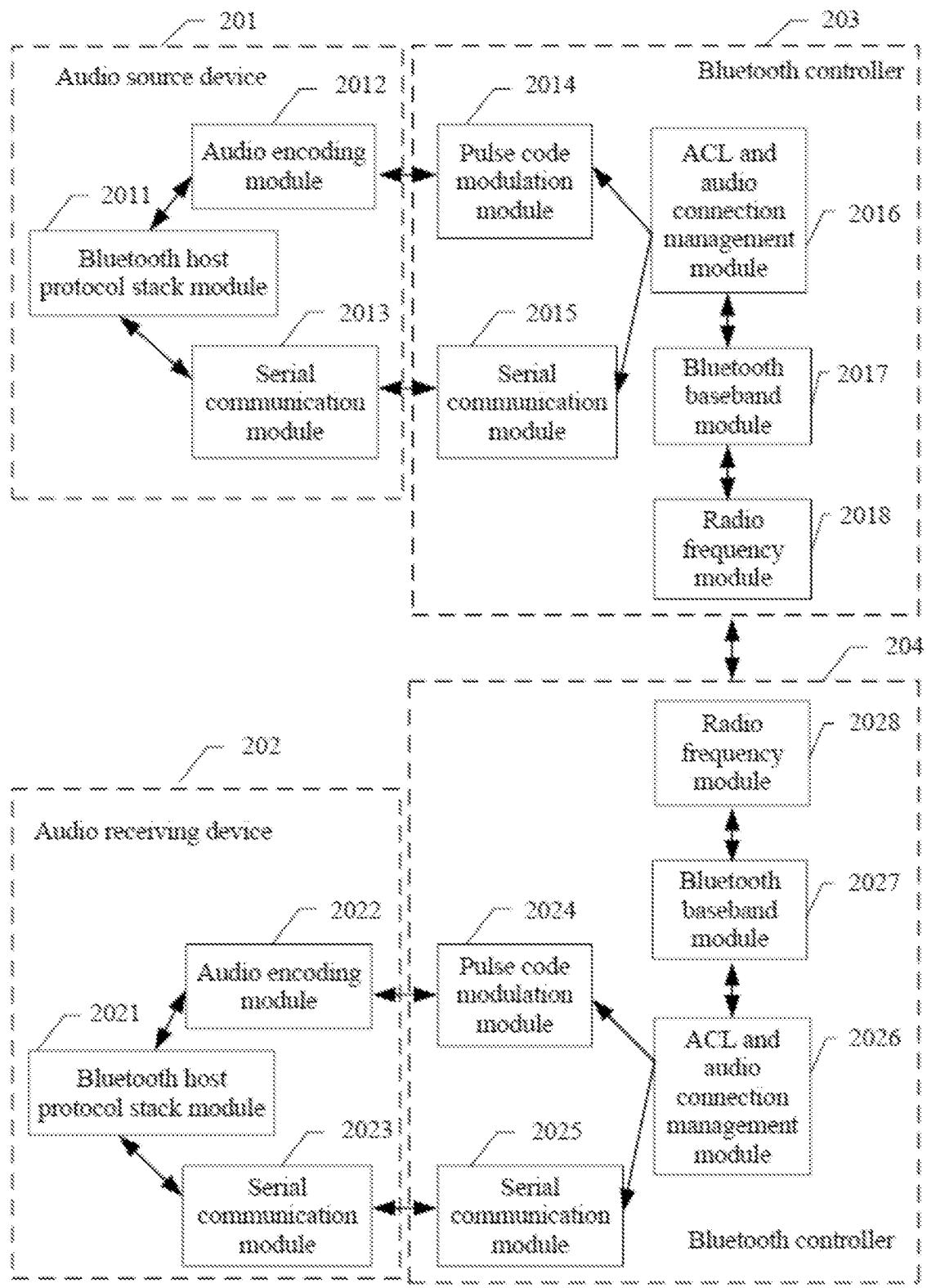
FIG. 2 is an overall schematic structural diagram of a BLUETOOTH system according to an embodiment of this application.

FIG. 2 is an overall schematic structural diagram of a BLUETOOTH system according to an embodiment of this application. The BLUETOOTH system includes an audio source device 201, a BLUETOOTH controller 203, an audio receiving device 202, and a BLUETOOTH controller 204. The audio source device 201 sends audio data to the audio receiving device 202 using the BLUETOOTH controller 203 and the BLUETOOTH controller 204.

A sending device includes the audio source device 201 and the BLUETOOTH controller 203. A receiving device includes the audio receiving device 202 and the BLUETOOTH controller 204. In this embodiment of this application, an example in which the sending device sends audio data to the receiving device is used for description. It should be understood that the receiving device may also send audio data to the sending device using a same technical solution.

In an optional case, a structure of the audio source device 201 is the same as a structure of the audio receiving device 202. The structure of the audio source device is used as an example for description below. The audio source device 201 includes a BLUETOOTH host protocol stack module 2011, an audio encoding module 2012, and a serial communication module 2013.

When transmitting audio data, the BLUETOOTH host protocol stack module 2011 may negotiate an audio encoding related parameter with the audio receiving device 202 using the audio encoding module 2012. Further, the BLUETOOTH host protocol stack module 2011 may transmit the audio data using the serial communication module 2013.

For example, the BLUETOOTH controller 203 includes a pulse-code modulation (PCM) module 2014, a serial communication module 2015, an ACL and audio connection management module 2016, a BLUETOOTH baseband module 2017, and a radio frequency module 2018.

The PCM module 2014 transmits an encoder parameter to the ACL and audio connection management module 2016.

The serial communication module 2015 transmits the audio data to the ACL and audio connection management module 2016. The ACL and audio connection management module 2016 transmits data to the BLUETOOTH controller 204 using the BLUETOOTH baseband module 2017 and the radio frequency module 2018.

For a structure and a function of the BLUETOOTH controller 204 of the receiving device, refer to descriptions of the BLUETOOTH controller 203, and details are not described herein again.

Figure 3:
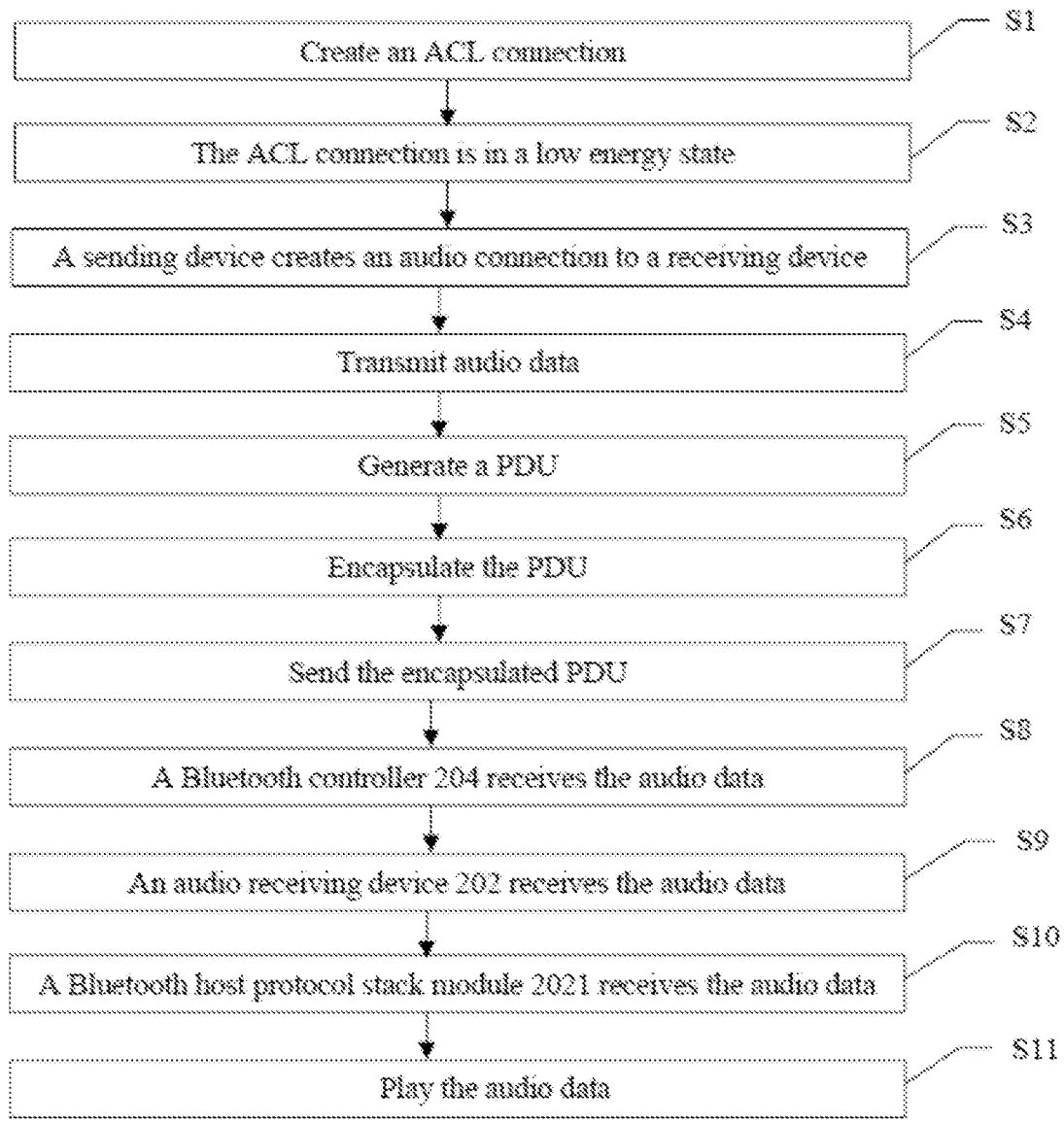
FIG. 3 is a schematic flowchart of audio data transmission in a BLUETOOTH system according to an embodiment of this application.

An audio data transmission method provided in an embodiment of this application is described below with reference to FIG. 2 and FIG. 3. The audio data transmission method further includes the following steps.

S1. Create an ACL connection.

For example, the audio source device creates an ACL connection to the audio receiving device 202 using the BLUETOOTH host protocol stack module 2011. The ACL connection may be a conventional BLUETOOTH ACL connection or a BLE ACL connection.

Further, the audio source device negotiates a codec parameter for the audio source device and the audio receiving device using the L2CAP layer protocol.

S2. The ACL connection is in a low energy state.

For example, when no audio is played or audio play is temporarily stopped, the ACL connection is in the low energy state with a short duty cycle.

In an example, when no audio is played or audio play is temporarily stopped, a breathing mode is used, where the breathing mode is implemented by updating a connection parameter to set a long-interval connection mode. In the breathing mode, a quantity of slots for sending data by the sending device is reduced, and a quantity of slots listened to by the receiving device is correspondingly reduced, to save power.

S3. The sending device creates an audio connection to the receiving device.

The sending device creates the audio connection to the receiving device, for transmission of high-definition audio data.

S4. Transmit audio data.

For example, the audio data is transmitted by the audio source device 201 to the BLUETOOTH controller 203 through a HCI or an inter-integrated circuit sound bus (I2S) interface after the audio source device 201 performs compression coding (lossy or lossless) on audio PCM data at an application layer.

S5. Generate a PDU.

Referring to FIG. 2, after the serial communication module 2015 receives the audio data from the HCI interface, the serial communication module 2015 transmits the audio data to the ACL and audio connection management module 2016, or after the PCM module 2014 receives the audio data from the audio encoding module 2012, the PCM module 2014 transmits the audio data to the ACL and audio connection management module 2016. The ACL and audio connection management module 2016 encapsulates the audio data, to generate the PDU.

For example, the PDU includes a control layer frame header and a payload. The payload is used to carry the audio data. It should be understood that the audio data carried in the payload may include audio data obtained by encoding original audio data, and optionally, the audio data may alternatively include audio data on which encryption and integrity check are performed.

Figure 10:
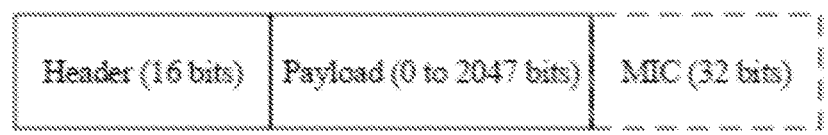
FIG. 10 is a schematic diagram of an audio PDU data format according to an embodiment of this application.

For example, FIG. 10 is a schematic diagram of a PDU data format according to an embodiment of this application.

In an optional case, if a payload is encrypted for transmission, message integrity check (MIC) is an integrity check bit of encrypted data, or if a payload is not encrypted for transmission, there is no MIC field.

Figure 11:
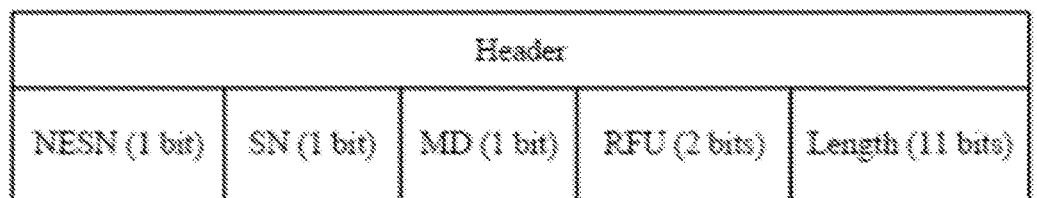
FIG. 11 is a schematic structural diagram of an audio PDU packet header according to an embodiment of this application.

For example, FIG. 11 is a schematic structural diagram of a PDU control layer frame header according to an embodiment of this application. The header includes a next sequence number (NESN) field, a sequence number (SN) field, and a more data (MD) field that are used to perform transmission with a peer device. A transmission mechanism of a BLE ACL packet is reused in this embodiment. A length of the NESN field is 1 bit, a length of the SN field is 1 bit, a length of the MD field is 1 bit, and a length of a reserved for future use (RFU) field is 2 bits. For example, the header includes indication information used to indicate a length of a payload. For example, in FIG. 11, the length indication information is represented by Length, and optionally, a length of Length is 11 bits, and a valid value ranges from 0 to 2047.

S6. Encapsulate the PDU.

Figure 8:
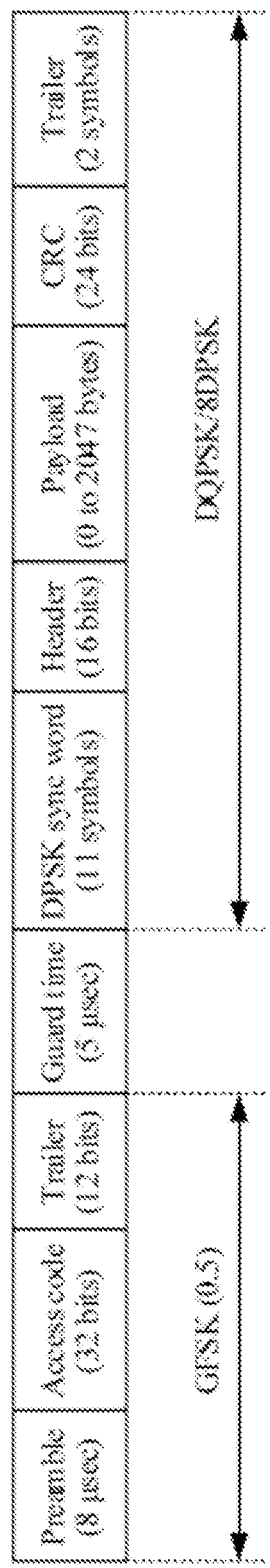
FIG. 8 is a schematic structural diagram of a high-definition audio physical frame according to an embodiment of this application.

Referring to FIG. 2, the BLUETOOTH baseband module 2017 encapsulates the PDU based on a time sequence parameter negotiated by the ACL and audio connection management module 2016. For example, the time sequence parameter includes a maximum transmission length of the PDU, a minimum transmission interval of the PDU, a maximum transmission interval of the PDU, and a connection anchor time of the PDU. The connection anchor time of the PDU is a time point after a start point location of a currently transmitted message. For example, the PDU is encapsulated based on a physical layer frame header, that is, one physical layer frame header is added before the PDU. In an optional case, the physical layer frame header is modulated using a GFSK modulation scheme having a modulation factor ranging from 0.45 to 0.55. The physical layer frame header may use a 2 NMz/4 NMz frame header of the GFSK. For example, the encapsulated PDU may be referred to as an audio data packet. FIG. 8 is a schematic structural diagram of a physical frame of an audio data packet according to an embodiment of this application.

Some fields in the physical frame are described below.

(1) Preamble

Figure 9:
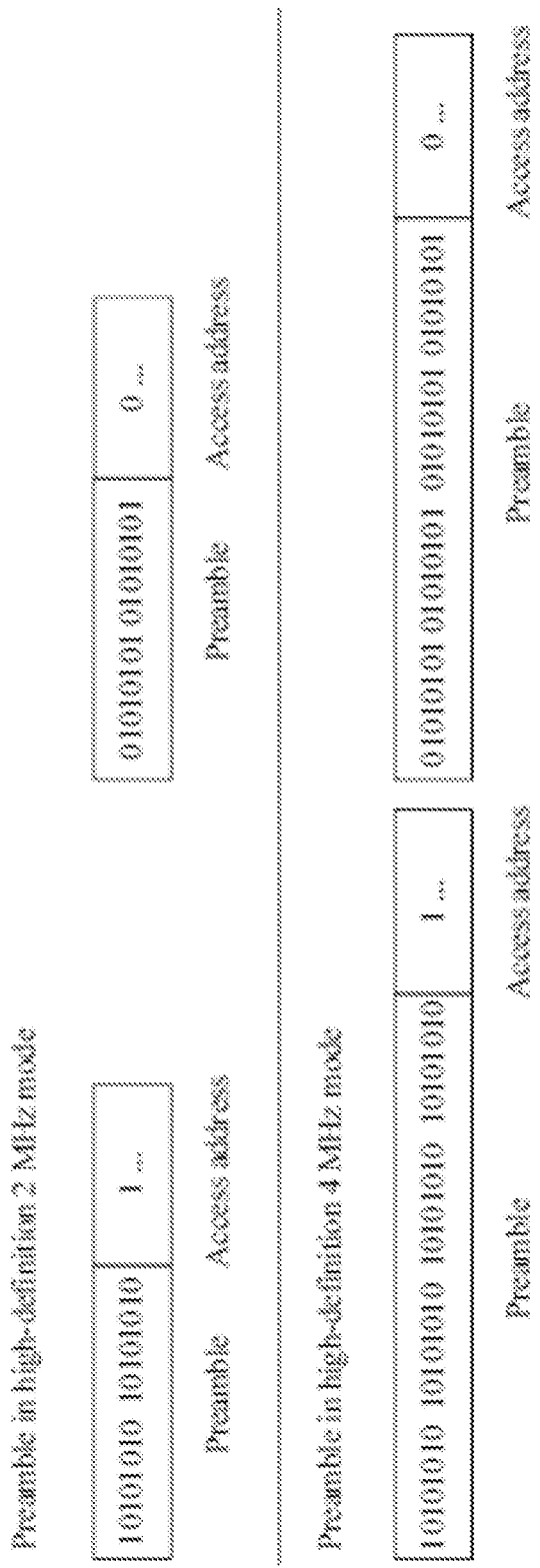
FIG. 9 is a schematic diagram of a preamble format according to an embodiment of this application.

FIG. 9 is a schematic diagram of a preamble format according to an embodiment of this application.

A time of the preamble is always 8 microseconds. A preamble of a high-definition 2 MHz channel includes 16 bits, and a preamble of a high-definition 4 MHz channel includes 32 bits. A bit format "1010" or "0101" is determined based on the first bit "1" or "0" of an access address.

In an example, if the first bit of the access address is 1, the preamble starts with "1010", or if the first bit of the access address is 0, the preamble starts with "0101".

(2) Referring to FIG. 9, the access address includes 32 bits, and a format in the BLUETOOTH BLE protocol is reused.

(3) Referring to FIG. 8, a trailer of the GFSK includes 12 all-zero bits.

(4) Referring to FIG. 8, a guard time is an interval calculated from the last trailer bit of the GFSK to the first bit of a DPSK synchronization word (sync word).

In an example, the guard time may be 5 microseconds, however, considering an actual fluctuation, the guard time is allowed to change within +/−0.25 microsecond. Values of the guard time may all be 0, or may be in a repeated form such as 0101.

(5) Referring to FIG. 8, a sync word of a DQPSK modulation scheme is 11 symbols and follows an EDR DQPSK design in a BLUETOOTH protocol. The first symbol is any phase (reference), and bits of the last 10 symbols are 0, 1, 1, 1, 0, 1, 1, 1, 0, 1, −1, 1, 1, 1, 0, 1, 0, 1, and 1.

A sync word of an 8DPSK modulation scheme is 11 symbols and follows an EDR 8DPSK design in a BLUETOOTH protocol. The first symbol is a reference, and bits of the last 10 symbols are 0, 1, 0, 1, 1, 1, 0, 1, 0, 1, 1, 1, 0, 1, 0, 1, 1, 1, 1, 1, 1, 0, 1, 0, 0, 1, 0, 0, 1, and 0.

(6) Referring to FIG. 8, a cyclic redundancy check (CRC) design follows a CRC structure of a BLE PDU, that is, a CRC includes a total of 24 bits. A linear-feedback shift register (LFSR) function is $X24+X10+X9+X6+X4+X3+X+1$.

(7) Referring to FIG. 8, a trailer of the DPSK is all-zero bits of two symbols.

A trailer bit of a DQPSK modulation scheme is {00, 00}, and a trailer bit of an 8DPSK modulation scheme is {000, 000}.

S7. Send the encapsulated PDU.

The radio frequency module 2018 sends, to a radio frequency module 2028, the PDU including the audio data.

S8. The BLUETOOTH controller 204 receives data.

The radio frequency module 2028 receives data from an air interface, and then transmits the data to a BLUETOOTH baseband module 2027 for demodulation, and then transmits the data to an ACL and audio connection management module 2026.

The ACL and audio connection management module 2026 is responsible for extracting the audio data and buffering the audio data, and transmitting the audio data to a serial communication module 2025 or a PCM module 2024.

S9. The audio receiving device 202 receives the audio data.

The serial communication module 2025 or the PCM module 2024 transmits the audio data to an audio codec module 2022 or a serial communication module 2023.

S10. A BLUETOOTH host protocol stack module 2021 receives the audio data.

The audio codec module 2022 or the serial communication module 2023 transmits the audio data to the BLUETOOTH host protocol stack module 2021.

S11. Play the audio data.

The BLUETOOTH host protocol stack module 2021 decodes the audio data and transmits the audio data to an audio application. The audio application can play the audio data through an audio interface of the audio receiving device 202.

In an optional case, the audio receiving device 202 returns an acknowledgement message to the audio source device 201, where the acknowledgement message is used to indicate a receiving status of the audio data. In an example, the acknowledgement message may be a BLE empty packet. Because the empty packet uses the GFSK modulation scheme, an anti-interference capability is strong, thereby facilitating receiving by the audio source device 201.

Figure 4:
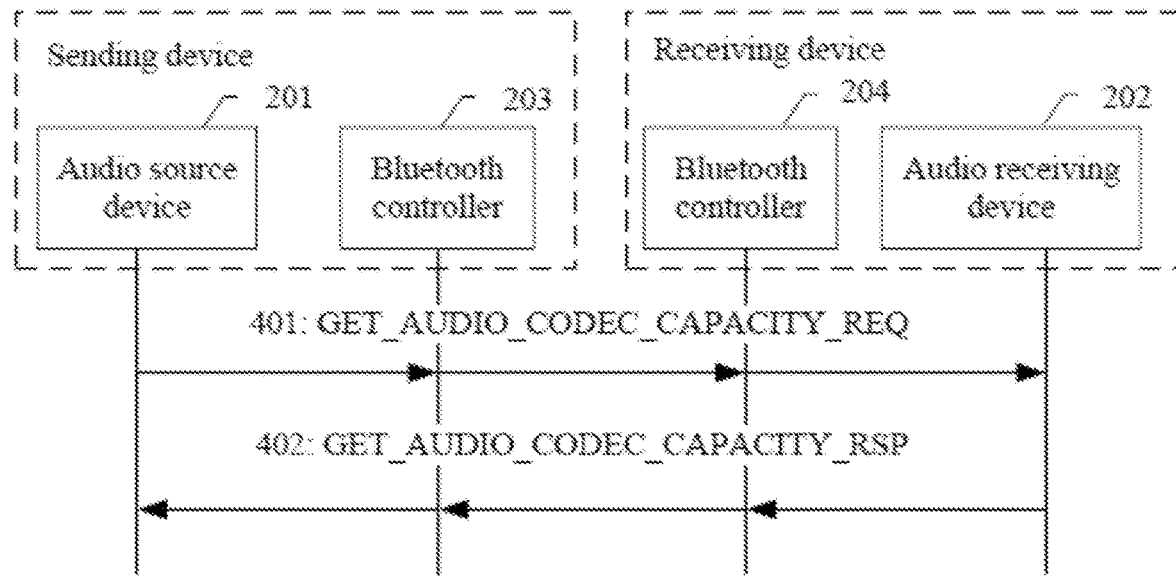
FIG. 4 is a schematic flowchart of querying an audio codec capability according to an embodiment of this application.

For example, FIG. 4 is a schematic flowchart of negotiating an audio codec parameter according to an embodiment of this application. The negotiation may further include the following steps.

401. An audio source device sends a GET_AUDIO_CODEC_CAPACITY_REQ message.

After an ACL connection is established between a sending device and a receiving device, the sending device may query an audio codec parameter of the receiving device, and correspondingly, the receiving device may also query a codec parameter of the sending device.

FIG. 4 is a schematic flowchart of querying an audio codec capability according to an embodiment of this application. An audio codec capability is queried based on a L2CAP channel.

Before the sending device transmits audio data to the receiving device, an audio source device 201 queries a codec parameter using a BLUETOOTH controller of a sending device 203, a BLUETOOTH controller 204 of the receiving device, and an audio receiving device 202.

First, the audio source device 201 sends the GET_AUDIO_CODEC_CAPACITY_REQ message using the BLUETOOTH controller 203 of the sending device, the BLUETOOTH controller 204 of the receiving device, and the audio receiving device 202, to learn of a codec index. The codec index includes an identifier of the codec parameter. In an example, the codec index includes a codec 0 and a codec 1.

Table 1 shows an example format of the GET_AUDIO_CODEC_CAPACITY_REQ message provided in this embodiment of this application.

TABLE 1

| 7 | 6 | 5 | 4 | 3 | 2 | 1 | 0 | Byte |
|---|---|---|---|---|---|---|---|------|
| Session identifier: session ID ||||||||| 0 |
| Command identifier: GET_AUDIO_CODEC_CAPACITY_REQ ||||||||| 1 |
| Codec index: codec index ||||||||| 2 |

In Table 1, a valid range of the session identifier may be 1 to 128.

The command identifier of the message is GET_AUDIO_CODEC_CAPACITY_REQ, and has a value of 1.

The codec index starts from 0. For example, when the codec index is 0xff, all codec capabilities are returned.

402. The audio receiving device 202 sends GET_AUDIO_CODEC_CAPACITY_RSP.

Then the audio receiving device 202 sends the GET_AUDIO_CODEC_CAPACITY_RSP using the BLUETOOTH controller 204 of the receiving device, the BLUETOOTH controller 203 of the sending device, and the audio source device 201, to respond to codec capability query request information such that the audio source device 201 learns of a codec parameter. In an example, the codec index includes a codec 0 and a codec 1, and the GET_AUDIO_CODEC_CAPACITY_RSP message includes a codec parameter with 0 and a codec parameter with 1.

Table 2 shows an example format of the GET_AUDIO_CODEC_CAPACITY_RSP provided in this embodiment of this application.

TABLE 2

| 7 | 6 | 5 | 4 | 3 | 2 | 1 | 0 | Byte |
|---|---|---|---|---|---|---|---|------|
| Session identifier: session ID ||||||||| 0 |
| Command identifier: GET_AUDIO_CODEC_CAPACITY_RSP ||||||||| 1 |
| Codec parameter: codec parameter with 0 |||||||||  |
| Codec parameter: codec parameter with 1 |||||||||  |
| . . . |||||||||  |

In Table 2, a valid range of the session identifier may be 1 to 128.

The command identifier is GET_AUDIO_CODEC_CAPACITY_RSP, and has a value of 2.

Table 3 shows an example of a data structure of a codec parameter provided in this embodiment of this application.

TABLE 3

| Parameter name | Meaning | Byte quantity |
|---|---|---|
| Codec index | The codec index starts from 0. If the codec index is 0xff, it indicates that there is no codec parameter. | 1 |
| Encoding type | Subband code (subband code, SBC), moving picture experts group (MPEG), MPEC-1, MPEG-2, and adaptive transform acoustic coding (Adaptive Transform Acoustic Coding, ATRAC) | 1 |
| Transmission mode | 0: A2DP profile<br>1: Transmission method in this embodiment of this application | 1 |
| Supported sampling rate | Bit 0: When this bit is set to 1, it indicates supporting 16000 samples/16 bits.<br>Bit 1: When this bit is set to 1, it indicates supporting 32000 samples/16 bits.<br>Bit 2: When this bit is set to 1, it indicates supporting 48000 samples/16 bits.<br>Bit 3: When this bit is set to 1, it indicates supporting 96000 samples/16 bits.<br>Bit 4: When this bit is set to 1, it indicates supporting 48000 samples/24 bits.<br>Bit 5: When this bit is set to 1, it indicates supporting 96000 samples/24 bits.<br>Another bit: reserved for extension | 1 |
| Audio channel mode | 0: Mono<br>1: Binaural<br>2: Stereo<br>Another value reserved | 1 |

It should be understood that the message formats shown in Table 1 to Table 3 are merely examples for description in the embodiments of this application, and are not intended to limit a message format. The values and the ranges of the parameters provided in the tables are also optional. Neither a message format nor a parameter value is limited in this application.

For example, based on the obtained codec capability, the audio source device configures specific codec parameters, for example, a negotiated encoding type for transmitting audio data between the audio source device and the audio receiving device, a transmission mode, a sampling rate, and an audio channel, to ensure that the audio source device and the audio receiving device use consistent codec parameters.

Figure 5:
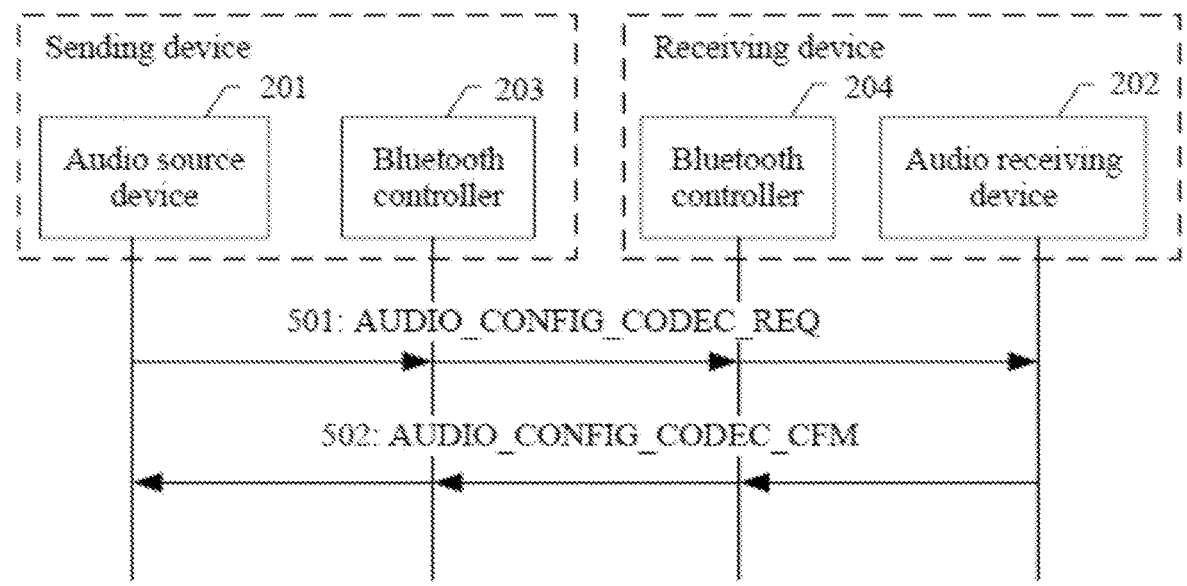
FIG. 5 is a schematic flowchart of configuring an audio codec according to an embodiment of this application.

FIG. 5 is a schematic flowchart of configuring an audio codec according to an embodiment of this application. The audio codec configuration procedure further includes the following steps.

501. An audio source device 201 sends an AUDIO_CONFIG_CODEC_REQ message.

First, the audio source device 201 sends the AUDIO_CONFIG_CODEC_REQ message using a BLUETOOTH controller 203 of a sending device, a BLUETOOTH controller 204 of a receiving device, and an audio receiving device 202, to select a codec parameter based on a codec index. In an example, if the codec index includes a codec 0 and a codec 1, a codec parameter with 0 and a codec parameter with 1 may be returned in the GET_AUDIO_CODEC_CAPACITY_RSP message.

Table 4 shows an example format of the AUDIO_CONFIG_CODEC_REQ message provided in this embodiment of this application.

TABLE 4

| 7 | 6 | 5 | 4 | 3 | 2 | 1 | 0 | Byte |
|---|---|---|---|---|---|---|---|------|
| Session identifier: session ID ||||||||| 0 |
| Command identifier: AUDIO_CONFIG_CODEC_REQ ||||||||| 1 |
| Codec index: codec index ||||||||| 2 |

In Table 4, the session identifier starts from 1, and is used to distinguish between different requests.

The command identifier is AUDIO_CONFIG_CODEC_REQ, and has a value of 3.

A valid value of the codec index starts from 0. For example, the codec index may be selected from a codec list returned in the GET_AUDIO_CODEC_CAPACITY_RSP message shown in Table 2.

502. The audio receiving device 202 sends an AUDIO_CONFIG_CODEC_CFM message.

Then the audio receiving device 202 sends the AUDIO_CONFIG_CODEC_CFM message to the audio source device 201 using the BLUETOOTH controller 204 of the receiving device and the BLUETOOTH controller 203 of the sending device, to notify the audio source device 201 of a configuration status of a codec parameter. In an example, if the configuration status is 0, it indicates that the codec parameter is successfully configured, or if the configuration status is not 0, it indicates that the codec parameter is unsuccessfully configured.

Table 5 shows an example format of the AUDIO_CONFIG_CODEC_CFM message provided in this embodiment of this application.

TABLE 5

| 7 | 6 | 5 | 4 | 3 | 2 | 1 | 0 | Byte |
|---|---|---|---|---|---|---|---|---|
| Session identifier: session ID | | | | | | | | 0 |
| Command identifier: AUDIO_CONFIG_CODEC_CFM | | | | | | | | 1 |
| Configuration status | | | | | | | | 2 |

In Table 5, the session identifier starts from 1, and corresponds to a session identifier of the received AUDIO_CONFIG_CODEC_REQ message.

The command identifier is AUDIO_CONFIG_CODEC_CFM, and has a value of 4.

For the configuration status, 0 indicates a success, and another value indicates an error.

Figure 6:
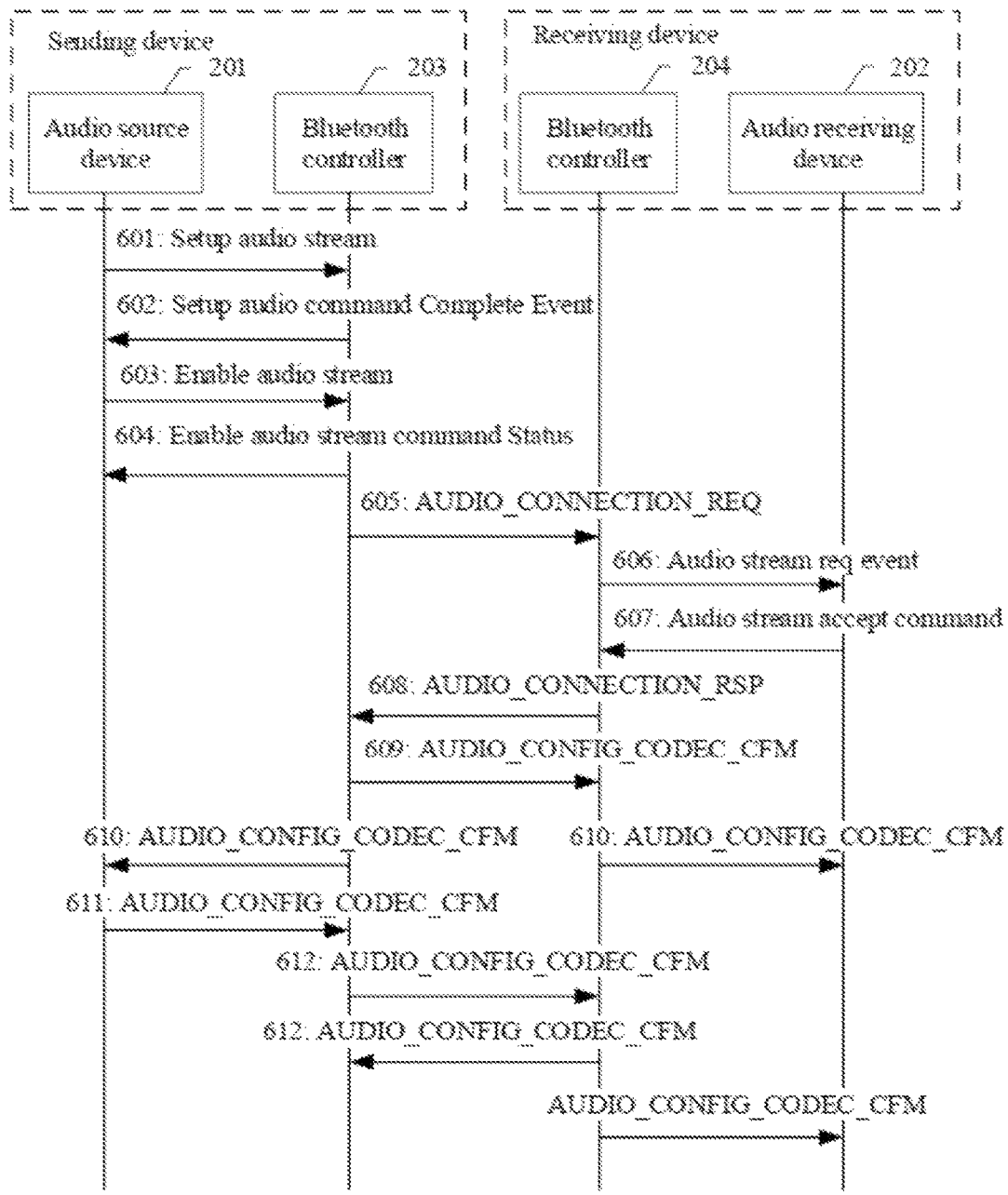
FIG. 6 is a schematic flowchart of creating an audio connection according to an embodiment of this application.

For example, for ease of understanding of a process of creating an audio connection, namely, S3, FIG. 6 is a signaling flowchart of a method for creating an audio connection according to an embodiment of this application. The method includes the following steps.

601. An audio source device 201 sends a Setup audio stream command to a BLUETOOTH controller 203.

It should be understood that, before the audio source device sends data to an audio receiving device, an audio connection needs to be created. In this embodiment of this application, a data transmission rate of a physical channel for transmitting an audio stream includes 4 Mb/s, 6 Mb/s, 8 Mb/s, or 12 Mb/s. Therefore, in a process of creating an audio connection, a physical channel for transmitting an audio stream needs to be determined.

For example, the audio source device 201 sends the Setup audio stream command to the BLUETOOTH controller 203, to notify the audio receiving device of a physical channel on which the audio stream is transmitted. In an example, 0 indicates a physical channel at a rate of 4 Mb/s, 1 indicates a physical channel at a rate of 6 Mb/s, 2 indicates a physical channel at a rate of 8 Mb/s, and 3 indicates a physical channel at a rate of 12 Mb/s. The physical channel for transmitting the audio stream can be learned of using a number.

For example, Table 6 shows a format of the Setup audio stream command provided in this embodiment of this application. Phy type may be used to identify the physical channel for transmitting the audio stream.

TABLE 6

| Command parameter | Description | Value range |
|---|---|---|
| ACL handle | ACL connection handle related to a high-definition audio stream | Consistent with a range of an ACL connection handle in a BT specification |
| Max payload size | A maximum audio payload size, calculated in bytes | 0 to 2047 bytes |
| Phy type | Physical channel for transmitting an audio stream | 0 indicates a physical channel at a rate of 4 Mb/s, 1 indicates a physical channel at a rate of 6 Mb/s, 2 indicates a physical channel at a rate of 8 Mb/s, and 3 indicates a physical channel at a rate of 12 Mb/s. |

602. The BLUETOOTH controller 203 sends a Setup audio command Complete Event message to the audio source device 201.

For example, the BLUETOOTH controller 203 notifies, based on the Setup audio command Complete Event message, the audio source device 201 of a result of executing the Setup audio stream command. Optionally, the BLUETOOTH controller 203 allocates an audio connection identifier to a current audio stream using the Setup audio command Complete Event message.

For example, Table 7 shows a format of the Setup audio command Complete Event message provided in this embodiment of this application.

TABLE 7

| Event parameter | Description | Value range |
|---|---|---|
| Status | Command execution status | 0: successful command execution 1: invalid command parameter |
| Audio connect handle | Connection identifier pre-allocated to the audio connection | 0 to 256 |

In an optional case, when a "status" of the Setup audio command Complete Event message returned by the BLUETOOTH controller to the audio source device is 0, it indicates that an audio stream setup command is successfully executed, or optionally, when a "status" is 1, it indicates that an audio stream setup command parameter is invalid.

603. The audio source device 201 sends an Enable audio stream command to the BLUETOOTH controller 203.

For example, the Enable audio stream command is used to enable or disable an audio stream command, that is, whether the audio source device agrees or disagrees to transmit the current audio stream using an audio connection identifier that is allocated using a Setup audio command Complete Event.

For example, Table 8 shows an example format of the Enable audio stream command provided in this embodiment of this application.

TABLE 8

| Command parameter | Description | Value range |
| --- | --- | --- |
| Audio connection handle | Audio connection identifier | 0 to 256 |
| Enable | 0: Disable<br>1: Enable | 0 or 1 |

For example, when "enable" in the Enable audio stream command is 0, it indicates that the audio source device disagrees to transmit the current audio stream using the allocated audio connection identifier, or optionally, when "enable" in the Enable audio stream command is 1, it indicates that the audio source device agrees to transmit the current audio stream using the allocated audio connection identifier.

604. The BLUETOOTH controller 203 sends an Enable audio stream command Status message to the audio source device 201.

The Enable audio stream command Status message is used to return a status after the Enable audio stream command is executed, that is, notify the audio source device of whether the Enable audio stream command is successfully executed.

For the Enable audio stream command Status message, for example, Table 9 shows a format of the Enable audio stream command Status message provided in this embodiment of this application.

TABLE 9

| Command parameter | Description | Value range |
| --- | --- | --- |
| Status | Command status | 0: successful command execution<br>1: invalid command parameter<br>Another value |

605. The BLUETOOTH controller 203 sends an AUDIO_CONNECTION_REQ message to the BLUETOOTH controller 204, to request to set up an audio connection between the sending device and the receiving device.

For example, Table 10 shows a format of the AUDIO-CONNECTION_REQ message provided in this embodiment of this application.

TABLE 10

| Message parameter | Description | Value range |
| --- | --- | --- |
| Audio connection handle | Audio connection identifier | 0 to 256 |
| Audio Phy type | Type of a physical channel for audio transmission | 0 indicates a physical channel at a rate of 4 Mb/s, 1 indicates a physical channel at a rate of 6 Mb/s, 2 indicates a physical channel at a rate of 8 Mb/s, and 3 indicates a physical channel at a rate of 12 Mb/s. |
| Max payload size | Maximum transmission length | 0 to 2047 bytes |
| Min connection interval | Minimum connection interval | 0 to 65535 microseconds |
| Max connection interval | Maximum connection interval | 0 to 65535 microseconds |
| Anchor point | Connection anchor time: a time point after a start point location of a currently transmitted message | 1 to 65535, at a step of 625 microseconds |

606. The BLUETOOTH controller 204 sends an Audio stream req event message to the audio receiving device 202, to notify the audio receiving device 202 that there is an audio connection request.

For example, Table 11 shows a format of the Audio stream req event message provided in this embodiment of this application.

TABLE 11

| Message parameter | Description | Value range |
| --- | --- | --- |
| ACL connection handle | ACL connection identifier | 0 to 0xfffe |
| Audio connection handle | Audio connection identifier | 0 to 256 |
| Audio Phy type | Type of a physical channel for audio transmission | 0 indicates a physical channel at a rate of 4 Mb/s, 1 indicates a physical channel at a rate of 6 Mb/s, 2 indicates a physical channel at a rate of 8 Mb/s, and 3 indicates a physical channel at a rate of 12 Mb/s. |
| Max payload size | Maximum transmission length | 0 to 2047 bytes |
| Min connection interval | Minimum connection interval | 0 to 65535 microseconds |
| Max connection interval | Maximum connection interval | 0 to 65535 microseconds |

607. The audio receiving device 202 sends an Audio stream accept command message to the BLUETOOTH controller 204 such that the audio receiving device 202 instructs the BLUETOOTH controller 204 to accept the audio connection request.

For example, Table 12 shows a format of the Audio stream accept command message provided in this embodiment of this application.

TABLE 12

| Message parameter | Description | Value range |
| --- | --- | --- |
| Audio connection handle | Audio connection identifier | 0 to 256 |

For example, the Audio stream accept command message carries an audio connection identifier. Optionally, the audio connection identifier may be any integer ranging from 0 to 256, and an audio connection on which a current audio data stream is transmitted is determined using the audio connection identifier.

608. The BLUETOOTH controller 204 sends an AUDIO_CONNECTION_RSP message to the BLUETOOTH controller 203. For example, the AUDIO_CONNECTION_RSP message may be an ACL control PDU message, and is used to return a message status to the BLUETOOTH controller 203 using a parameter. In an example, when the parameter is 0, the returned message status is "accepting the AUDIO_CONNECTION_REQ message", or when the parameter is 1, the returned message status is "invalid parameter", or when the parameter is 2, the returned message status is "system busy", or when the parameter is 3, the returned message status is "insufficient resources".

For example, Table 13 shows a format of the AUDIO_CONNECTION_RSP message provided in this embodiment of this application.

TABLE 13

| Message parameter | Description | Value range |
| --- | --- | --- |
| Status | Message status reply notification | 0: accepting the AUDIO_CONNECTION_REQ message<br>1: invalid parameter<br>2: system busy<br>3: insufficient resources |
| Audio connection handle | Audio connection identifier | 0 to 256 |
| Preferred offset | Acceptable clock offset relative to an anchor point | 0 to 65535 microseconds |

609. The BLUETOOTH controller 203 sends an AUDIO_CONNECTION_CONFIRM message to the BLUETOOTH controller 204, to indicate that the audio connection request can be accepted.

For example, Table 14 shows a format of the AUDIO_CONNECTION_CONFIRM message provided in this embodiment of this application.

TABLE 14

| Message parameter | Description | Value range |
| --- | --- | --- |
| Audio connection handle | Audio connection identifier | 0 to 256 |
| Access address | Value of an access address of the audio connection | 32 bits, a generated format needs to meet a requirement for a BLUETOOTH access address. |
| CRC init value | CRC initial value of the audio connection | 0x00 to 0xffff |
| Anchor point | Connection anchor time: a time point after a start point location of a currently transmitted message | 1 to 65535, at a step of 625 microseconds |
| Offset | Offset relative to an anchor point, used to precisely set a sending time point of the audio data | 0 to 65535 microseconds |
| Channel map | Corresponding to corresponding available channel mapping, a channel index is from 0 to 39, and is mapped to 40 bits, for example, a zeroth bit corresponds to a channel 0, a first bit corresponds to a channel 1, and the rest may be deduced by analogy. If a value of a bit is 0, it indicates that the channel is unavailable, or if a value of a bit is 1, it indicates that the channel is available. | 1 to 40 |
| Hopstep | Frequency hopping step | 1 to 16 |

610. The BLUETOOTH controller 203 sends an Audio connection ready event message to the audio receiving device 202.

The BLUETOOTH controller 203 notifies, based on the Audio connection ready event message, the audio source device 201 that the audio connection is already established, or the BLUETOOTH controller 204 may notify, based on the Audio connection ready event message, the audio receiving device 202 that the audio connection is already established, and then the audio data can be transmitted between the audio source device 201 and the audio receiving device 202.

For example, Table 15 shows a message structure of the Audio connection ready event provided in this embodiment of this application.

TABLE 15

| Event parameter | Description | Value range |
| --- | --- | --- |
| Status | Command execution status | 0: successful audio connection<br>1: unsuccessful audio connection |
| Audio connect handle | Connection identifier pre-allocated to the audio connection | 0 to 256 |

611. The audio source device 201 sends audio stream data to the BLUETOOTH controller 203.

The audio data is transmitted by the audio source device 201 to the BLUETOOTH controller 203 through a HCI or an I2S interface after the audio source device 201 performs compression coding (lossy or lossless) on audio PCM data at an application layer.

612. The BLUETOOTH controller 203 sends LL_AUDIO_DATA to the BLUETOOTH controller 204.

The BLUETOOTH controller 203 sends, to the BLUETOOTH controller 204, a PDU including the audio data.

Modulation of the audio data is described below with reference to FIG. 7.

Figure 7:
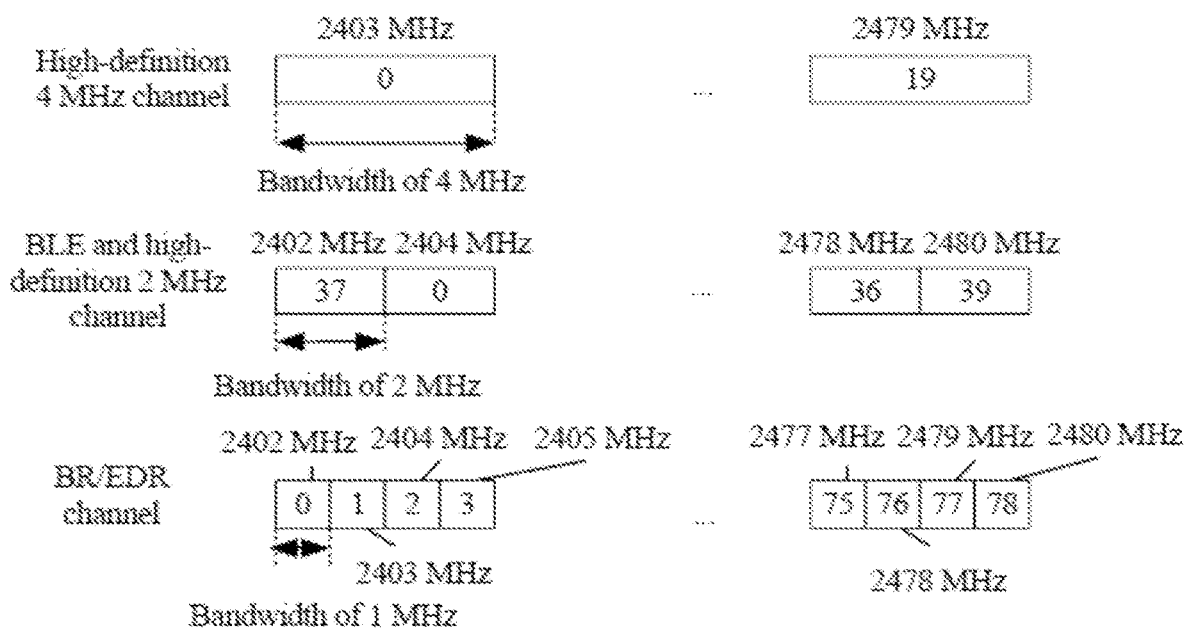
FIG. 7 is a schematic diagram of distribution of audio transmission channels according to an embodiment of this application.

FIG. 7 is a schematic diagram of distribution of audio transmission channels according to an embodiment of this application.

A BLUETOOTH basic rate (BR) and an EDR mode are based on a bandwidth of 1 MHz, channel center frequencies are 2402 MHz, 2403 MHz, 2404 MHz, . . . , 2479 MHz, and 2480 MHz, and there are a total of 79 channels.

BLE is based on a bandwidth of 2 MHz, channel center frequencies are 2402 MHz, 2404 MHz, 2406 MHz, . . . , 2478 MHz, and 2480 MHz, and there are a total of 40 channels.

In this embodiment of this application, there are two bandwidths for high-definition audio transmission 2 MHz and 4 MHz. For coexistence of BLUETOOTH channels and to reduce interference between existing BLUETOOTH channels, in a high-definition 2 MHz mode, same BLE 2 MHz physical channels are distributed, while in a high-definition 4 MHz mode, BLE 2 MHz physical channels are aggregated to combine two adjacent 2 MHz physical channels into a 4 MHz physical channel, where a center frequency of the 4 MHz physical channel is equal to an average value of center frequencies of the two adjacent 2 MHz physical channels. There are a total of 20 channels for the high-definition 4 MHz mode, and this conforms to an access requirement for at least 20 channels for a frequency hopping system in many countries.

In an optional case, voice transmission in a BLUETOOTH protocol is performed in the EDR mode, a frame header is modulated using a GFSK scheme having a modulation factor of 0.32, a payload is modulated using DQPSK or 8DPSK, and a symbol rate is 1 MHz. A bit rate of the DQPSK is twice the symbol rate, namely, 2 Mb/s, and a bit rate of the 8DPSK is three times the symbol rate, namely, 3 Mb/s. It should be understood that, in this embodiment of this application, the symbol rate may also be referred to as a modulation rate, or the bit rate may also be referred to as a data transmission rate.

A feature of EDR is to increase a data transmission rate of a BLUETOOTH technology to 2.1 Mb/s. In addition to achieving more stable audio stream transmission and lower power consumption, an advantage of a bandwidth can be fully used to connect a plurality of BLUETOOTH devices.

BLE is a low-cost, short-range, interoperable, and robust wireless technology. The BLE uses many intelligent means to minimize power consumption. Specifically, a variable connection time interval may be used, and the interval may be set to several milliseconds to several seconds based on a specific application. In addition, because the BLE uses a very fast connection method, a power-saving state can be maintained usually. In this case, two ends of a link only know that a peer end is still connected. The link is enabled only when necessary, and then the link is disabled in a shortest possible time.

In this embodiment of this application, the PDU including the audio data may be encapsulated based on a physical layer frame header, to obtain an audio data packet. The physical layer frame header is modulated using a first digital modulation scheme, and the PDU is modulated using a second digital modulation scheme. A value of a modulation rate of the first digital modulation scheme is equal to a value of a data transmission rate, and a value of a modulation rate of the second digital modulation scheme is less than the value of the data transmission rate. In this way, the audio data packet can be sent at the data transmission rate on a BLE physical channel. It should be understood that a modulation rate of a modulation scheme is a symbol rate in a unit of hertz (Hz), a data transmission rate is a bit rate in a unit of bits per second (bps), and there is usually a proportional relationship between a value of the modulation rate of the modulation scheme and a value of the data transmission rate. For example, one symbol in the GFSK modulation scheme carries one information bit, and therefore, a modulation rate (symbol rate) of the GFSK modulation scheme is equal to the data transmission rate (bit rate), one symbol in the DQPSK modulation scheme carries two information bits, and therefore, a modulation rate (symbol rate) of a 2*DQPSK modulation scheme is equal to the data transmission rate (bit rate), and one symbol in the 8DPSK modulation scheme carries three information bits, and therefore, a modulation rate (symbol rate) of a 3*DQPSK modulation scheme is equal to the data transmission rate (bit rate). It should be understood that, because the unit of the modulation rate is different from that of the data transmission rate, the foregoing proportional relationship indicates a proportion between the values, regardless of the unit.

There are three modulation methods for a digital signal: amplitude modulation, frequency modulation, and phase modulation. Other various modulation methods are improved combinations of the three methods. Gaussian minimum shift keying (GMSK) is an improvement of minimum shift keying (MSK), and is to insert a Gaussian low-pass pre-modulation filter before an MSK modulator to increase spectrum utilization and improve communication quality.

In an example, the modulation scheme for the frame header may be the GFSK. In addition, when the modulation factor of the GFSK is equal to a modulation factor of GFSK in the BLE, an original hardware device can be used, without a need to update a device, thereby saving hardware resources. The modulation factor of the GFSK in the BLE ranges from 0.45 to 0.55, that is, the modulation factor of the GFSK in the BLE is greater than or equal to 0.45, and less than or equal to 0.55.

In this embodiment of this application, the audio data may be transmitted based on the EDR mode. For combination with a BLUETOOTH BLE mode, the modulation factor of the GFSK of the physical layer frame header is equal to the modulation factor of the GFSK in the BLE. That is, the physical layer frame header uses the GFSK scheme having a modulation factor ranging from 0.45 to 0.55, and the payload uses the DQPSK or the 8DPSK.

In this embodiment of this application, the modulation scheme for the physical layer frame header is referred to as the first digital modulation scheme, and the modulation scheme for the payload is referred to as the second digital modulation scheme. A relationship between the first digital modulation scheme and the second digital modulation scheme and the data transmission rate may be the value of the modulation rate of the first digital modulation scheme is equal to the value of the data transmission rate, and the value of the modulation rate of the second digital modulation scheme is less than the value of the data transmission rate.

The physical layer frame header is modulated using the first digital modulation scheme, and the PDU is modulated using the second digital modulation scheme. Because the physical layer frame header and the PDU are modulated using two different modulation schemes, the modulation rate of the physical layer frame header is different from the modulation rate of the PDU, and the modulation rate of the modulation scheme for the PDU is lower than the data transmission rate, that is, a same symbol can carry more bits, thereby increasing an audio data transmission rate. Therefore, transmission of high-definition audio data can be supported.

In an example, the data transmission rate is N times the modulation rate of the second digital modulation scheme, where N is an integer greater than 1.

In this embodiment of this application, the modulation scheme that can be used by the physical layer frame header is the GFSK, and the modulation scheme that can be used by the payload is the DQPSK or the 8DPSK.

For the GFSK modulation scheme, the data transmission rate is equal to the modulation rate of the GFSK.

For the DQPSK modulation scheme, the data transmission rate is twice the modulation rate of the DQPSK.

For the 8DPSK modulation scheme, the data transmission rate is three times the modulation rate of the 8DPSK.

In this embodiment of this application, a modulation rate of a high-definition 2 MHz mode is 2 MHz, a data transmission rate of GFSK in the high-definition 2 MHz mode is 2 MHz, a data transmission rate of DQPSK in the high-definition 2 MHz mode is twice the modulation rate, namely, 4 Mb/s, and a data transmission rate of 8DPSK is three times the modulation rate, namely, 6 Mb/s.

A modulation rate of a high-definition 4 MHz mode is 4 MHz, a data transmission rate of GFSK in the high-definition 4 MHz mode is 4 MHz, a data transmission rate of DQPSK in the high-definition 4 MHz mode is twice the modulation rate, namely, 8 Mb/s, and a data transmission rate of 8DPSK is three times the modulation rate, namely, 12 Mb/s.

It can be learned from the foregoing content that, in the high-definition 2 MHz mode, a highest data transmission rate is 6 Mb/s, and in the high-definition 4 Hz mode, a highest data transmission rate is 12 Mb/b/s.

Apparently, based on the technical solution in this embodiment of this application, the value of the data transmission rate is greater than 3 Mb/s. In this way, transmission of high-definition audio data can be supported.

Table 16 shows a correspondence between a BLUETOOTH voice and a bit rate. It can be learned from content in Table 16 that, in this embodiment of this application, the audio data can be transmitted on a physical channel having a bandwidth of 2 MHz or a bandwidth of 4 MHz based on the EDR mode. The frame header may be modulated using the GFSK having a modulation factor that is equal to a BLE modulation factor. The payload is modulated using the DQPSK or the 8DPSK. In this way, the audio data can be transmitted in the EDR mode on the BLE channel.

TABLE 16

| | Symbol rate | Modulation scheme for the frame header | Modulation scheme for the payload | Bit rate |
|---|---|---|---|---|
| BLUETOOTH voice | 1 MHz | GFSK (0.32) | DQPSK | 2 Mb/s |
| | | | 8DPSK | 3 Mb/s |
| High-definition voice 2 MHz mode | 2 MHz | GFSK (0.45 to 0.55) | DQPSK | 4 Mb/s |
| | | | 8DPSK | 6 Mb/s |
| High-definition voice 4 MHz mode | 4 MHz | GFSK (0.45 to 0.55) | DQPSK | 8 Mb/s |
| | | | 8DPSK | 12 Mb/s |

After receiving the acknowledgement message, the audio source device may end the audio connection. The audio data is transmitted to the audio receiving device 202 using the audio source device 201, the BLUETOOTH controller 203, and the BLUETOOTH controller 204.

Figure 12:
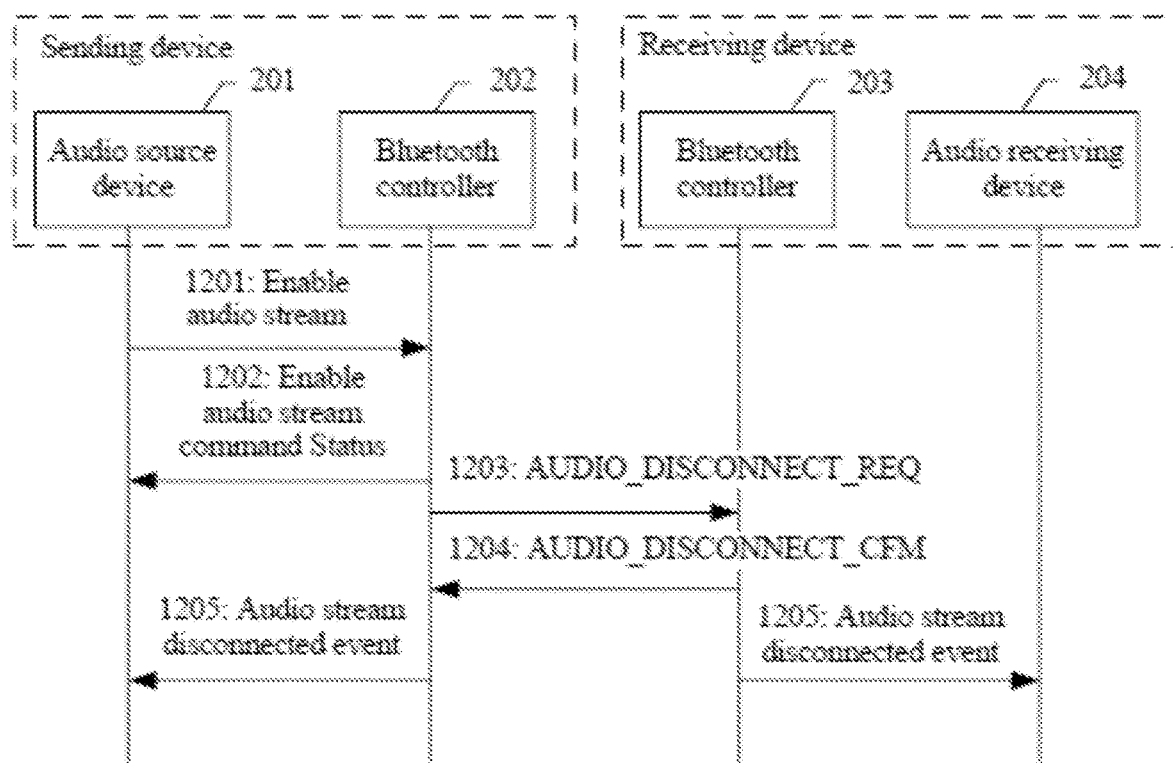
FIG. 12 is a schematic flowchart of ending an audio connection according to an embodiment of this application.

FIG. 12 is a schematic flowchart of ending an audio connection according to an embodiment of this application.

1201. An audio source device 201 sends an Enable audio stream command to a BLUETOOTH controller 203.

The audio source device 201 sends the Enable audio stream command to the BLUETOOTH controller 203, to apply to the BLUETOOTH controller 203 for ending an audio connection.

For example, for a message format of the Enable audio stream command provided in this embodiment of this application, refer to Table 17, where an enable parameter is 0, and 0 indicates ending an audio connection.

TABLE 17

| Command parameter | Description | Value range |
|---|---|---|
| Audio connect handle | Audio connection identifier | 0 to 256 |
| Enable | 0: Ending an audio connection | 0 |

1202. The BLUETOOTH controller 203 sends an Enable audio stream command Status message to the audio source device 201.

The BLUETOOTH controller 203 sends the Enable audio stream command Status message to the audio source device 201, to return, to the audio source device 201, a status after the Enable audio stream command is executed.

For example, for a message format of the Enable audio stream command Status message provided in this embodiment of this application, refer to Table 9.

1203. The BLUETOOTH controller 203 sends an AUDIO_DISCONNECT_REQ message to a BLUETOOTH controller 204.

The BLUETOOTH controller 203 sends the AUDIO_DISCONNECT_REQ message to the BLUETOOTH controller 204, to determine that an identifier for ending the audio connection is required.

For example, for a format of the AUDIO_DISCONNECT_REQ message provided in this embodiment of this application, refer to Table 18.

TABLE 18

| Message parameter | Description | Value range |
|---|---|---|
| Audio connection handle | Audio connection identifier | 0 to 256 |
| Reason | Reason for ending the audio connection | 0 to 256 |

1204. The BLUETOOTH controller 204 sends an AUDIO_DISCONNECT_CFM message to the BLUETOOTH controller 203.

The BLUETOOTH controller 204 sends the AUDIO_DISCONNECT_CFM message to the BLUETOOTH controller 203, to determine that the identifier for ending the audio connection is required.

For example, for a format of the AUDIO_DISCONNECT_CFM message provided in this embodiment of this application, refer to Table 19.

TABLE 19

| Message parameter | Description | Value range |
|---|---|---|
| Audio connection handle | Audio connection identifier | 0 to 256 |
| Status | Audio disconnection status | 0: successful disconnection<br>Another value: unsuccessful disconnection |

1205. The BLUETOOTH controller 203 sends an Audio stream disconnected event to the audio receiving device 202 using the audio source device 201 and the BLUETOOTH controller 204.

The BLUETOOTH controller 203 sends the Audio stream disconnected event to the audio source device 201, and the BLUETOOTH controller 204 sends the Audio stream disconnected event to the audio receiving device 202, to notify whether the audio connection is successfully ended.

For example, for a format of the Audio stream disconnected event provided in this embodiment of this application, refer to Table 20.

TABLE 20

| Message parameter | Description | Value range |
|---|---|---|
| Audio connection handle | Audio connection identifier | 0 to 256 |
| Status | Audio disconnection status | 0: successful disconnection<br>Another value: unsuccessful disconnection |

So far, in this embodiment of this application, an audio codec parameter is first negotiated, and then the audio codec parameter is configured. After the audio connection is created, the audio source device 201 transmits audio with the audio receiving device 202 using the BLUETOOTH controller 204 and the BLUETOOTH controller 203. Finally, the audio connection is ended.

Figure 13:
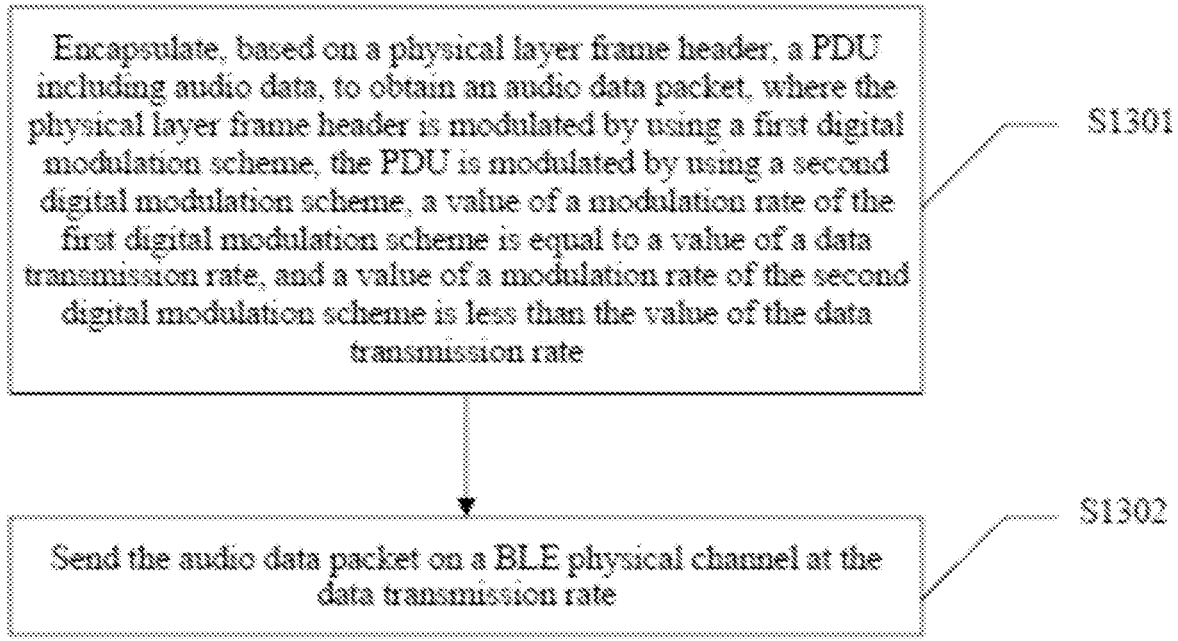
FIG. 13 is a schematic flowchart of an audio data transmission method according to an embodiment of this application.

FIG. 13 is a schematic flowchart of an audio data transmission method according to an embodiment of this application. This embodiment of this application is performed by a sending device. The audio data transmission method further includes the following steps.

S1301. Encapsulate, based on a physical layer frame header, a PDU including audio data, to obtain an audio data packet, where the physical layer frame header is modulated using a first digital modulation scheme, the PDU is modulated using a second digital modulation scheme, a value of a modulation rate of the first digital modulation scheme is equal to a value of a data transmission rate, and a value of a modulation rate of the second digital modulation scheme is less than the value of the data transmission rate.

The sending device needs to send the audio data to a receiving device. The sending device modulates the frame header based on the first digital modulation scheme. In an example, a modulation scheme for a data signal may be GFSK.

For combination with a BLE mode, the frame header may use a GFSK scheme having a modulation factor ranging from 0.45 to 0.55. The PDU is used to carry the audio data, and the PDU is modulated using the second digital modulation scheme. In an example, the PDU may be modulated using DQPSK or 8DPSK.

S1302. Send the audio data packet on a BLE physical channel at the data transmission rate.

The sending device can send the audio data packet on the BLE physical channel. In this way, the receiving device can receive the encapsulated PDU on the BLE physical channel.

In this embodiment of this application, the physical layer frame header is modulated using the first digital modulation scheme, and the PDU is modulated using the second digital modulation scheme. Because the physical layer frame header and the PDU are modulated using two different modulation schemes, the modulation rate of the modulation scheme for the PDU is lower than the data transmission rate, that is, a same symbol can carry more bits, thereby increasing an audio data transmission rate. Therefore, transmission of high-definition audio data can be supported.

In an embodiment of this application, a codec generates a modulation scheme identifier of the BLE physical channel such that based on the modulation scheme identifier, it can be determined that the physical layer frame header uses the first digital modulation scheme and the PDU uses the second digital modulation scheme, and sends the modulation scheme identifier. The modulation scheme used by the physical layer frame header and the modulation scheme used by the PDU can be determined based on the modulation scheme identifier. In this way, the sending device can modulate the physical layer frame header and the PDU using the determined modulation schemes.

In an embodiment of this application, the data transmission rate is N times the modulation rate of the second digital modulation scheme. High-definition audio data can be transmitted on the BLE physical channel at the data transmission rate based on the PDU that is modulated using the second digital modulation scheme. In an embodiment of this application, the control layer frame header includes indication information used to indicate a length of the audio data. In this way, the receiving device can verify, based on the indication information for the audio data in the control layer frame header, whether the received audio data is complete.

In an embodiment of this application, a bandwidth of the BLE physical channel is 2 MHz, or a bandwidth of the BLE physical channel is 4 MHz, and the physical channel having the bandwidth of 4 MHz is formed by combining two adjacent physical channels each having a bandwidth of 2 MHz. In this embodiment of this application, the audio data can be transmitted at different transmission rates using different bandwidths.

In an embodiment of this application, the first digital modulation scheme includes the GFSK, and the second digital modulation scheme includes the DQPSK or the 8DPSK. In this way, compatibility between a BLE mode and an EDR mode is implemented, and power consumption can be reduced while the audio data is transmitted at a high speed.

In an embodiment of this application, a modulation factor of the GFSK ranges from 0.45 to 0.55 such that an original hardware device can be used to implement the technical solution in this embodiment of this application, thereby saving hardware resources.

In an embodiment of this application, a codec parameter may be queried using the L2CAP, and the codec parameter includes a coding parameter of the audio data, and original audio data is encoded based on the coding parameter, to obtain the audio data. Optionally, the audio data may be audio data on which a process such as encryption or integrity check is performed.

In an example, if the codec parameter has an index of 0 and is indicated by 0, it indicates that the coding parameter supports a sampling rate 16000 of 16 bits, or if the codec parameter has an index of 1 and is indicated by 1, it indicates that the coding parameter supports a sampling rate 32000 of 16 bits.

In this embodiment of this application, the coding parameter is queried using the L2CAP, and the original audio data is encoded, to ensure normal audio play.

Figure 14:
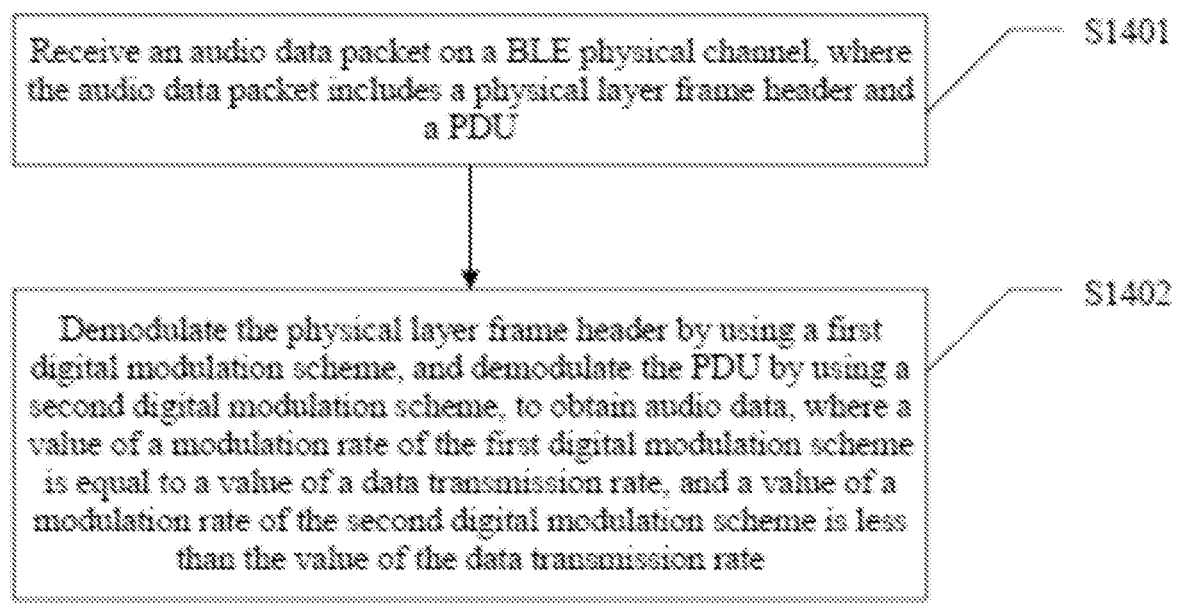
FIG. 14 is a schematic flowchart of an audio data transmission method according to another embodiment of this application.

FIG. 14 is a schematic flowchart of an audio data transmission method according to another embodiment of the present application. This embodiment of this application may be performed by a receiving device. The audio data transmission method further includes the following steps.

S1401. Receive an audio data packet on a BLE physical channel, where the audio data packet includes a physical layer frame header and a PDU.

The receiving device may receive, on the BLE physical channel, the audio data packet sent by a sending device, where a bandwidth of the BLE physical channel is 2 MHz or 4 MHz.

S1402. Demodulate the physical layer frame header using a first digital modulation scheme, and demodulate the PDU using a second digital modulation scheme, to obtain audio data, where a value of a modulation rate of the first digital modulation scheme is equal to a value of a data transmission rate, and a value of a modulation rate of the second digital modulation scheme is less than the value of the data transmission rate.

The receiving device demodulates the physical layer frame header of the audio data packet using the first digital modulation scheme, and demodulates the PDU of the audio data packet using the second digital modulation scheme, to obtain the audio data.

In an example, the physical layer frame header is modulated based on GFSK, that is, the physical layer frame header of the audio data packet may be demodulated using the GFSK.

The PDU of the audio data packet is demodulated using the second digital modulation scheme, to obtain the audio data. In an example, the second digital modulation scheme is DQPSK or 8DPSK, and the PDU of the audio data packet is demodulated using the DQPSK or the 8DPSK, to obtain the audio data.

In this embodiment of this application, the audio data packet is received on the BLE physical channel, the physical layer frame header is demodulated using the first digital modulation scheme, and the PDU is demodulated using the second digital modulation scheme. The modulation rate of the modulation scheme for the PDU is lower than the data transmission rate, that is, a same symbol can carry more bits, thereby increasing an audio data transmission rate, and supporting transmission of high-definition audio data. In an embodiment of this application, the receiving device may receive a modulation scheme identifier of the BLE physical channel. In this way, the receiving device may learn, based on the modulation scheme identifier, that the physical layer frame header uses the first digital modulation scheme and the PDU uses the second digital modulation scheme, to successfully demodulate the audio data.

In an embodiment of this application, when the receiving device receives or does not receive the audio data, an acknowledgement message needs to be returned to the sending device, where the acknowledgement message is used to indicate a receiving status of the audio data. For example, the receiving status of the audio data includes that the audio data is already received and/or the audio data is not received.

In an example, a BLE empty packet may be used, that is, the BLE empty packet is returned to the sending device, to indicate the receiving status of the audio data. Because the BLE empty packet uses a GFSK modulation scheme, an anti-interference capability is strong, thereby facilitating receiving by the sending device.

Figure 15:
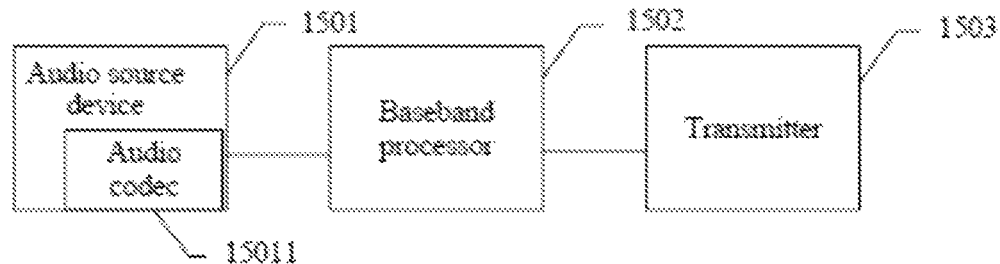
FIG. 15 is a schematic structural diagram of an audio data transmission device according to an embodiment of this application.

FIG. 15 is a schematic structural diagram of an audio data transmission device according to an embodiment of this application. The audio data transmission device corresponds to the audio data transmission method in FIG. 13. The audio data transmission device in FIG. 15 further includes an audio source device 1501, a baseband processor 1502, and a transmitter 1503.

An audio source device 1501 sends audio data to a baseband processor 1502, the baseband processor 1502 encapsulates a PDU of the audio data, and then the transmitter 1503 sends an audio data packet.

The audio source device 1501 sends the audio data to the baseband processor.

The baseband processor 1502 encapsulates, based on a physical layer frame header, the PDU including the audio data, to obtain the audio data packet, where a physical layer frame header is modulated using a first digital modulation scheme, the PDU is modulated using a second digital modulation scheme, a value of a modulation rate of the first digital modulation scheme is equal to a value of a data transmission rate, and a value of a modulation rate of the second digital modulation scheme is less than the value of the data transmission rate.

The transmitter 1503 sends the audio data packet on a BLE physical channel at the data transmission rate.

For example, the audio source device 1501 may be a power amplifier, a multimedia console, a digital audio mixer, an audio sampling card, a synthesizer, or the like.

In this embodiment of this application, the physical layer frame header is modulated using the first digital modulation scheme, and the PDU is modulated using the second digital modulation scheme. Because the physical layer frame header and the PDU are modulated using two different modulation schemes, the modulation rate of the modulation scheme for the PDU is lower than the data transmission rate, that is, a same symbol can carry more bits, thereby increasing an audio data transmission rate. Therefore, transmission of high-definition audio data can be supported.

In this embodiment of this application, the data transmission rate may be N times the modulation rate of the second digital modulation scheme, where N is an integer greater than 1.

In this embodiment of this application, the PDU includes a control layer frame header and a payload, the payload is used to carry the audio data, and the control layer frame header includes indication information used to indicate a length of the audio data.

In this embodiment of this application, a bandwidth of the BLE physical channel is 2 MHz, or a bandwidth of the BLE physical channel is 4 MHz, and the physical channel having the bandwidth of 4 MHz is formed by combining two adjacent physical channels each having a bandwidth of 2 MHz.

In this embodiment of this application, the first digital modulation scheme may include GFSK, and the second digital modulation scheme may include DQPSK or 8DPSK.

In this embodiment of this application, a modulation factor of the GFSK ranges from 0.45 to 0.55, that is, the modulation factor of the GFSK is greater than or equal to 0.45, and less than or equal to 0.55.

In this embodiment of this application, the audio source device 1501 further includes an audio codec 15011. The audio codec 15011 is configured to generate a modulation scheme identifier of the BLE physical channel. The baseband processor 1502 may determine, based on the modulation scheme identifier, the modulation scheme used by the PDU. In this way, the baseband processor 1502 of an audio sending device can modulate the physical layer frame header and the PDU using the determined modulation schemes. Further, the transmitter 1503 sends the modulation scheme identifier of the physical channel to a receiving device such that the receiving device can demodulate the physical layer frame header and the PDU using corresponding modulation schemes.

In this embodiment of this application, the audio codec 15011 queries a codec parameter using the L2CAP, where the codec parameter includes a coding parameter of the audio data. Further, the codec 15011 encodes original audio data based on the coding parameter, to obtain the audio data. The coding parameter is queried using the L2CAP, and the original audio data is encoded, to ensure normal audio play.

Figure 16:
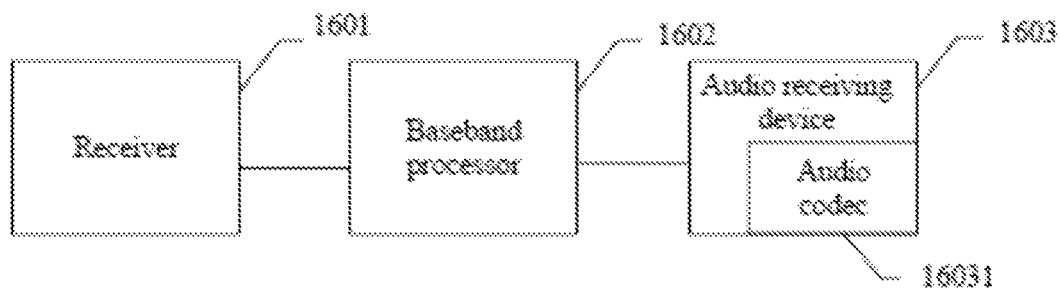
FIG. 16 is a schematic structural diagram of an audio data transmission device according to an embodiment of this application.

FIG. 16 is a schematic structural diagram of a receiving device according to an embodiment of this application, where an audio data transmission device corresponds to the audio data transmission method in FIG. 14.

The audio data transmission device in FIG. 16 further includes a receiver 1601, a baseband processor 1602, and an audio receiving device 1603.

The receiver 1601 receives an audio data packet on a BLE physical channel, the baseband processor 1602 demodulates the audio data packet, to obtain audio data, and the audio receiving device 1603 receives the audio data sent by the baseband processor 1602.

The receiver 1601 receives the audio data packet on the BLE physical channel, where the audio data packet includes a physical layer frame header and a PDU.

The baseband processor 1602 demodulates the physical layer frame header using a first digital modulation scheme, and demodulates the PDU using a second digital modulation scheme, to obtain audio data carried in a payload, where a value of a modulation rate of the first digital modulation scheme is equal to a value of a data transmission rate, and a value of a modulation rate of the second digital modulation scheme is less than the value of the data transmission rate.

The audio receiving device 1603 receives the audio data from the baseband processor 1602.

In this embodiment of this application, the audio data packet is received on the BLE physical channel, the physical layer frame header is demodulated using the first digital modulation scheme, and the PDU is demodulated using the second digital modulation scheme. The modulation rate of the modulation scheme for the PDU is lower than the data transmission rate, that is, a same symbol can carry more bits, thereby increasing an audio data transmission rate, and supporting transmission of high-definition audio data. In an embodiment of this application, the audio receiving device 1603 further includes an audio codec 16031.

The receiver 1601 is configured to receive a modulation scheme identifier of the BLE physical channel.

The audio codec 16031 is configured to determine, based on the modulation scheme identifier, that the physical layer frame header uses the first digital modulation scheme, and determine, based on the modulation scheme identifier, that the PDU uses the second digital modulation scheme.

In this way, the first digital modulation scheme and the second digital modulation scheme can be determined based on the modulation scheme identifier, and then the audio data can be successfully demodulated.

In an embodiment of this application, a data transmission rate is N times the modulation rate of the second digital modulation scheme, where N is an integer greater than 1.

In an embodiment of this application, when the receiver 1601 receives or does not receive the audio data, an acknowledgement message needs to be returned to the sending device, where the acknowledgement message is used to indicate a receiving status of the audio data. For example, the receiving status of the audio data includes that the audio data is already received and/or the audio data is not received.

In an example, a BLE empty packet is used, that is, the BLE empty packet is returned to the sending device, to indicate the receiving status of the audio data. Because the BLE empty packet uses the GFSK modulation scheme, an anti-interference capability is strong, thereby facilitating receiving by the sending device.

Figure 17:
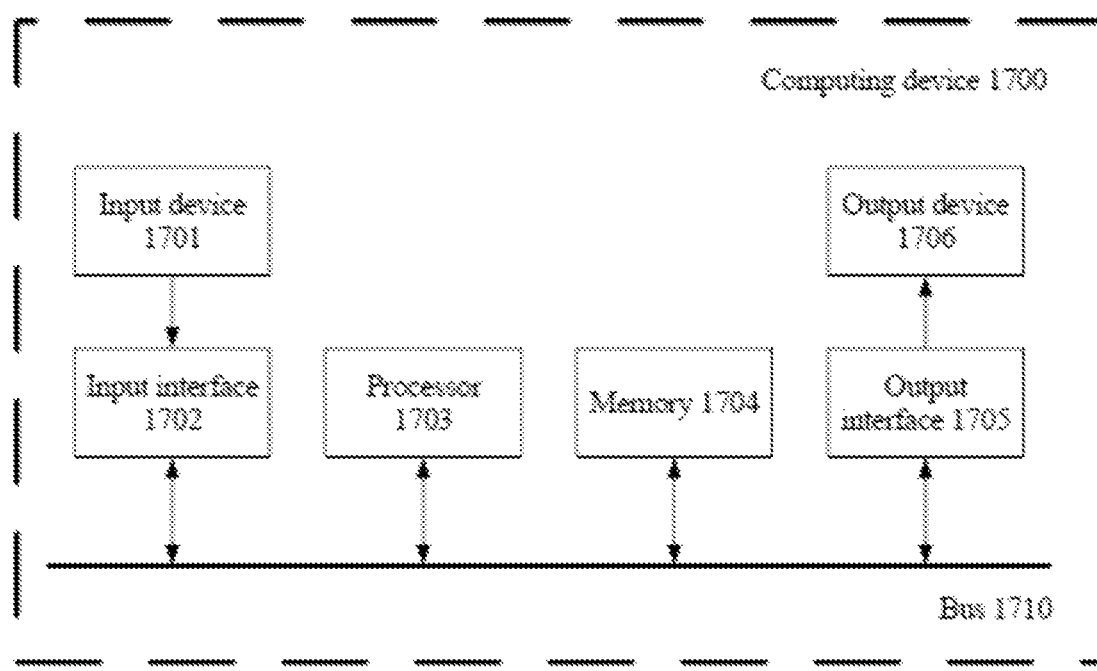
FIG. 17 is a structural diagram of an example hardware architecture of a computing device that can implement an audio data transmission method and device according to embodiments of this application.

FIG. 17 is an example diagram of a hardware architecture for transmitting audio data according to an embodiment of this application. As shown in FIG. 17, a computing device 1700 includes an input device 1701, an input interface 1702, a processor 1703, a memory 1704, an output interface 1705, and an output device 1706.

The input interface 1702, the processor 1703, the memory 1704, and the output interface 1705 are connected to each other using a bus 1710. The input device 1701 and the output device 1706 are connected to the bus 1710 by respectively using the input interface 1702 and the output interface 1705, to connect to another component of the computing device 1700.

Specifically, the input device 1701 receives external input information, and transmits the input information to the processor 1703 using the input interface 1702. The processor 1703 processes the input information according to a computer executable instruction stored in the memory 1704, to generate output information, temporarily or permanently stores the output information in the memory 1704, and then transmits the output information to the output device 1706 through the output interface 1705. The output device 1706 outputs the output information to the outside of the computing device 1700 for use by a user.

The computing device 1700 may perform the steps in the foregoing audio data transmission method in this application.

The processor 1703 may be one or more central processing units (CPU). When the processor 1701 or the processor 1701 is one CPU, the CPU may be a single-core CPU or a multi-core CPU.

The memory 1704 may be but is not limited to one or more of a random access memory (RAM), a read-only memory (ROM), an erasable programmable read-only memory (EPROM), a compact disc read-only memory (CD-ROM), a hard disk, and the like. The memory 1704 is configured to store program code.

All or some of the foregoing embodiments may be implemented using software, hardware, firmware, or any combination thereof. When some or all of the foregoing embodiments are implemented in a form of a computer program product, the computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The embodiments in this specification are all described in a progressive manner. For same or similar parts in the embodiments, reference may be made between these embodiments, and each embodiment focuses on a difference from other embodiments. Especially, apparatus and system embodiments are basically similar to the method embodiments, and therefore are described briefly, for related parts, reference may be made to descriptions in the method embodiments.

The invention claimed is:

1. A method, comprising:
    obtaining a data packet, wherein the data packet comprises a physical layer frame header and a protocol data unit (PDU), wherein the physical layer frame header is modulated using a first digital modulation scheme, wherein a first modulation rate of the first digital modulation scheme is equal to a value of a data transmission rate, wherein the PDU is modulated using a second digital modulation scheme, wherein a second modulation rate of the second digital modulation scheme is less than the value, wherein the data transmission rate is N times the second modulation rate, and wherein N is an integer greater than 1; and
    sending the data packet on a physical channel at the data transmission rate.

2. The method of claim 1, further comprising:
    generating a modulation scheme identifier of the physical channel;
    determining, based on the modulation scheme identifier, whether the physical layer frame header uses the first digital modulation scheme and whether the PDU uses the second digital modulation scheme; and
    sending the modulation scheme identifier.

3. The method of claim 1, wherein a bandwidth of the physical channel is 4 megahertz (MHz), and wherein the bandwidth is based on a combination of two adjacent physical channels each having a bandwidth of 2 MHz.

4. The method of claim 1, wherein the PDU comprises a control layer frame header and a payload, wherein the payload carries data, and wherein the control layer frame header comprises indication information that indicates a length of the data.

5. The method of claim 1, wherein a bandwidth of the physical channel is 2 megahertz (MHz).

6. The method of claim 1, wherein the first digital modulation scheme comprises Gaussian frequency-shift keying (GFSK), and wherein the second digital modulation scheme comprises either differential quadrature phase-shift keying (DQPSK) or 8-differential phase-shift keying (8DPSK).

7. The method of claim 6, wherein a modulation factor of the GFSK ranges from 0.45 to 0.55.

8. The method of claim 1, further comprising:
  querying a codec parameter using a Logical Link Control and Adaptation Protocol (L2CAP), wherein the codec parameter comprises a coding parameter; and
  encoding, based on the coding parameter, original data to obtain encoded data.

9. A method, comprising:
  receiving a data packet on a physical channel, wherein the data packet comprises a physical layer frame header and a protocol data unit (PDU);
  demodulating the physical layer frame header using a first digital modulation scheme, wherein a first modulation rate of the first digital modulation scheme is equal to a value of a data transmission rate; and
  demodulating the PDU using a second digital modulation scheme to obtain data,
  wherein a second modulation rate of the second digital modulation scheme is less than the value,
  wherein the data transmission rate is N times the second modulation rate, and
  wherein N is an integer greater than 1.

10. The method of claim 9, further comprising:
  receiving a modulation scheme identifier of the physical channel;
  determining, based on the modulation scheme identifier, that the physical layer frame header uses the first digital modulation scheme; and
  determining, based on the modulation scheme identifier, that the PDU uses the second digital modulation scheme.

11. The method of claim 9, wherein a bandwidth of the physical channel is 4 megahertz (MHz), and wherein the bandwidth is based on a combination of two adjacent physical channels each having a bandwidth of 2 MHz.

12. The method of claim 9, wherein after demodulating the PDU using the second digital modulation scheme to obtain the data, the method further comprises returning an acknowledgement message indicating a receiving status of the data.

13. An apparatus, comprising:
  a baseband processor configured to:
    obtain a data packet, wherein the data packet comprises a physical layer frame header and a protocol data unit (PDU), wherein the physical layer frame header is modulated using a first digital modulation scheme, wherein a first modulation rate of the first digital modulation scheme is equal to a value of a data transmission rate, wherein the PDU is modulated using a second digital modulation scheme, wherein a second modulation rate of the second digital modulation scheme is less than the value, wherein the data transmission rate is N times the second modulation rate, and wherein N is an integer greater than 1; and
  a transmitter coupled to the baseband processor and configured to send the data packet on a physical channel at the data transmission rate.

14. The apparatus of claim 13, further comprising a codec coupled to the baseband processor and configured to generate a modulation scheme identifier of the physical channel, wherein the baseband processor is further configured to determine, based on the modulation scheme identifier, whether the physical layer frame header uses the first digital modulation scheme and whether the PDU uses the second digital modulation scheme, and wherein the transmitter is further configured to send the modulation scheme identifier.

15. The apparatus of claim 13, wherein a bandwidth of the physical channel is 4 megahertz (MHz), and wherein the bandwidth is based on a combination of two adjacent physical channels each having a bandwidth of 2 MHz.

16. The apparatus of claim 13, wherein the PDU comprises a control layer frame header and a payload, wherein the payload carries data, and wherein the control layer frame header comprises indication information that indicates a length of the data.

17. The apparatus of claim 13, wherein a bandwidth of the physical channel is 2 megahertz (MHz).

18. The apparatus of claim 13, wherein the first digital modulation scheme comprises Gaussian frequency-shift keying (GFSK), and wherein the second digital modulation scheme comprises either differential quadrature phase-shift keying (DQPSK) or 8-differential phase-shift keying (8DPSK).

19. The apparatus of claim 18, wherein a modulation factor of the GFSK ranges from 0.45 to 0.55.

20. The apparatus of claim 13, wherein the baseband processor is further configured to:
  query a codec parameter using a Logical Link Control and Adaptation Protocol (L2CAP), wherein the codec parameter comprises a coding parameter; and
  encode, based on the coding parameter, original data to obtain encoded data.

* * * * *